United States Patent
Kim et al.

(10) Patent No.: US 11,853,147 B2
(45) Date of Patent: Dec. 26, 2023

(54) SYSTEM-ON-CHIP AND METHOD OF OPERATING THE SAME

(71) Applicant: SAMSUNG ELECTRONICS CO., LTD., Suwon-si (KR)

(72) Inventors: Jiwoong Kim, Yongin-si (KR); Moonki Jang, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 23 days.

(21) Appl. No.: 17/752,008

(22) Filed: May 24, 2022

(65) Prior Publication Data
US 2022/0283888 A1    Sep. 8, 2022

Related U.S. Application Data

(63) Continuation of application No. 16/774,058, filed on Jan. 28, 2020, now Pat. No. 11,366,711.

(30) Foreign Application Priority Data

Jul. 19, 2019 (KR) .......................... 10-2019-0087527

(51) Int. Cl.
*G06F 11/07* (2006.01)

(52) U.S. Cl.
CPC ...... *G06F 11/0751* (2013.01); *G06F 11/0745* (2013.01); *G06F 11/0787* (2013.01)

(58) Field of Classification Search
CPC ............ G06F 11/0751; G06F 11/0745; G06F 11/0787; G06F 11/0772; G06F 11/0739; G06F 15/7807; G06F 11/3024; G06F 11/3037; G06F 11/0724; G06F 11/0757; G06F 11/0793

USPC ........................................................ 714/49
See application file for complete search history.

(56) References Cited

U.S. PATENT DOCUMENTS

| | | | |
|---|---|---|---|
| 9,897,651 | B2 | 2/2018 | Bansal et al. |
| 10,228,736 | B2 | 3/2019 | Hu et al. |
| 2002/0178416 | A1 | 11/2002 | Chen et al. |
| 2006/0136919 | A1 | 6/2006 | Aingaran et al. |
| 2017/0139411 | A1 | 5/2017 | Hartung et al. |
| 2017/0309349 | A1 | 10/2017 | Mondal et al. |
| 2019/0052277 | A1 | 2/2019 | Rapeta et al. |

(Continued)

FOREIGN PATENT DOCUMENTS

| | | |
|---|---|---|
| JP | 2010-128627 A | 6/2010 |
| JP | 6465003 B2 | 2/2019 |
| KR | 10-2018-0067134 A | 6/2018 |

OTHER PUBLICATIONS

Andrew Michael Jones et al. "Architecting Secure Automotive Systems" Architecture and Technology Group, Arm, Oct. 2017 (19 pages total).

*Primary Examiner* — Yair Leibovich
(74) *Attorney, Agent, or Firm* — Sughrue Mion, PLLC

(57) ABSTRACT

A system-on-chip is provided. The system-on-chip includes a system bus, a plurality of IP units connected to the system bus, a processor unit including a plurality of cores configured to control the plurality of IP units via the system bus, a monitoring unit configured to monitor a state of the processor unit, and an error detection unit configured to operate as a master device for the plurality of IP units and monitor a register in which error information indicating whether an error has occurred in each of the plurality of IP units is stored.

20 Claims, 20 Drawing Sheets

(56) References Cited

U.S. PATENT DOCUMENTS

2019/0056735 A1 2/2019 Koopman et al.
2020/0142795 A1* 5/2020 Kato .................... G06F 11/263

* cited by examiner

SYSTEM-ON-CHIP AND METHOD OF OPERATING THE SAME

CROSS-REFERENCE TO RELATED APPLICATION

This is a Continuation application of U.S. application Ser. No. 16/774,058 filed on Jan. 28, 2020, which claims priority from Korean Patent Application No. 10-2019-0087527 filed on Jul. 19, 2019 in the Korean Intellectual Property Office, the disclosures of which are incorporated herein by reference in their entireties.

BACKGROUND

Methods and apparatuses consistent with example embodiments relate to a system-on-chip and a method of operating the same.

System-on-chips are semiconductor devices that include various intellectual property (IP) units, along with processor units including a core that performs major operations. System-on-chips are used as main components of autonomous vehicles, as well as a variety of electronic devices including computer devices, and the application range thereof is expanding.

SUMMARY

One or more example embodiments provide a system-on-chip in which, whether an error has occurred may be quickly detected and the generated error may be stably processed, by actively monitoring a register storing error information indicating whether an error has occurred in each of a plurality of IP units, and a method of operating the same.

According to an aspect of an example embodiment, a system-on-chip includes a system bus, a plurality of IP units connected to the system bus, a processor unit including a plurality of cores configured to control the plurality of IP units via the system bus, a monitoring unit configured to monitor a state of the processor unit, and an error detection unit configured to operate as a master device for the plurality of IP units and monitor a register in which error information indicating whether an error has occurred in each of the plurality of IP units is stored.

According to an aspect of an example embodiment, a system-on-chip includes a system bus, a processor unit having a plurality of cores, a plurality of IP units configured to operate based on a control command received from the processor unit via the system bus, each of the plurality of IP units comprising a register configured to store error information indicating whether an error has occurred, and an error detection unit configured to monitor the register in each of the plurality of IP units, identify whether the error has occurred based on the error information, and transfer the error information to the processor unit based on the error information stored in the register not being initialized for a predetermined period of time after identifying the error has occurred.

According to an aspect of an example embodiment, a system-on-chip includes a processor unit having a plurality of cores, an interrupt controller configured to transfer an interrupt to the processor unit, a plurality of IP units having a register in which error information indicating whether an error has occurred is stored, and an error detection unit configured to monitor the register in each of the plurality of IP units to identify whether an error has occurred in each of the plurality of IP units, and transmit information indicating an IP unit among the plurality of IP units in which an error has occurred to the processor unit through the interrupt controller. The error detection unit is configured to reset the IP unit in which the error has occurred based on the error information not being initialized in the register of the IP unit in which the error has occurred after transmitting the information indicating the IP unit to the processor unit through the interrupt controller.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments will be described with reference to the accompanying drawings. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1A:
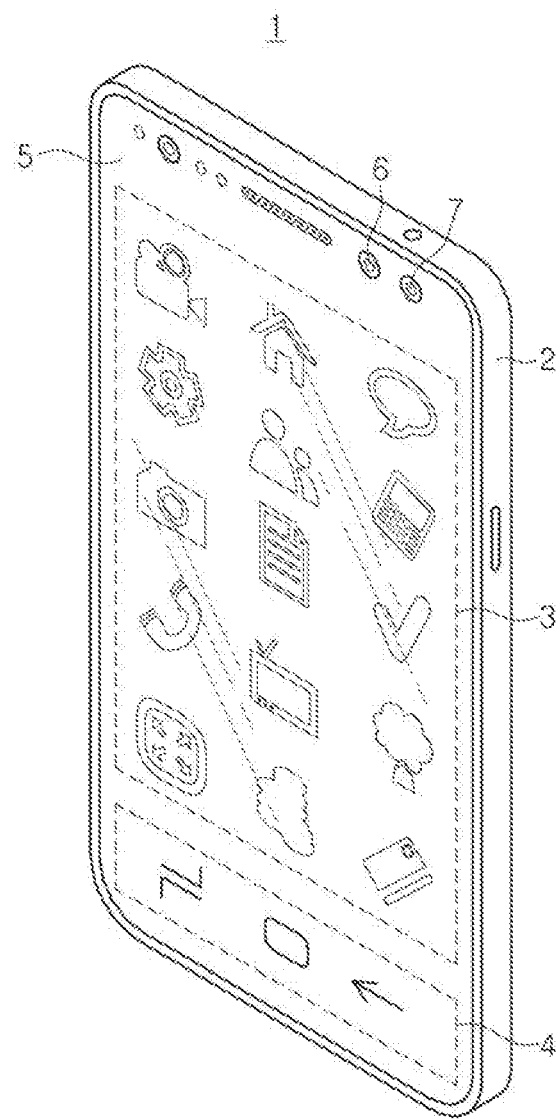
FIGS. 1A, 1B and 2 are diagrams schematically illustrating apparatuses in which a system-on-chip according to an example embodiment may be mounted.
Figure 1B:
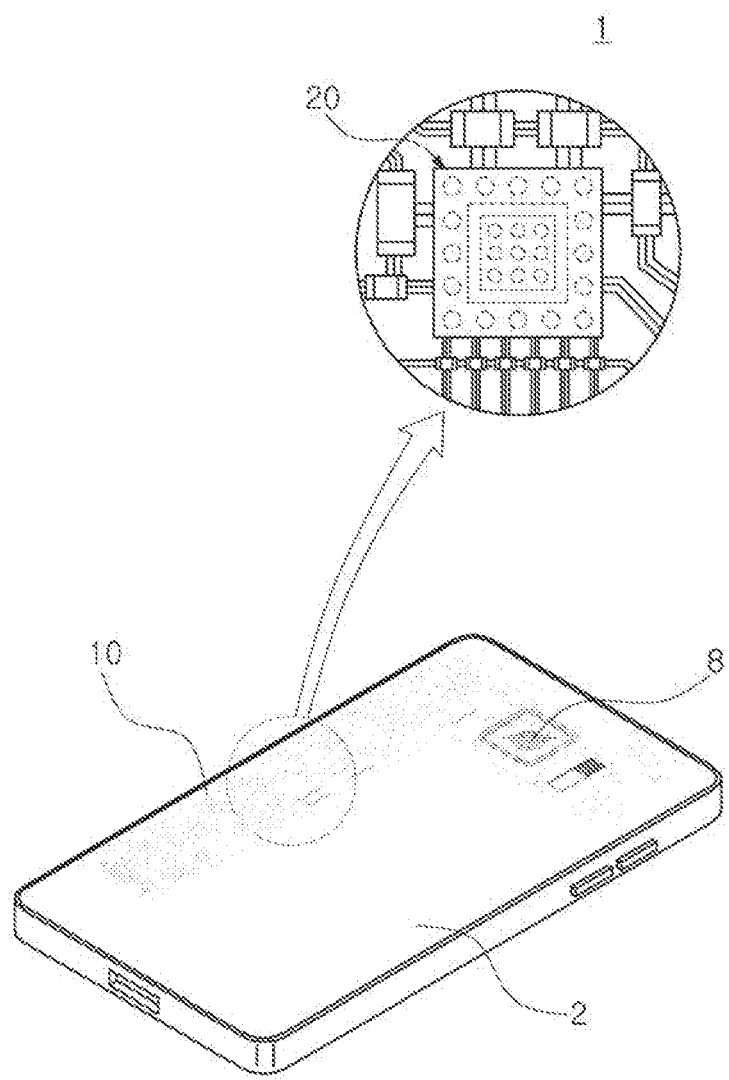
Figure 2:
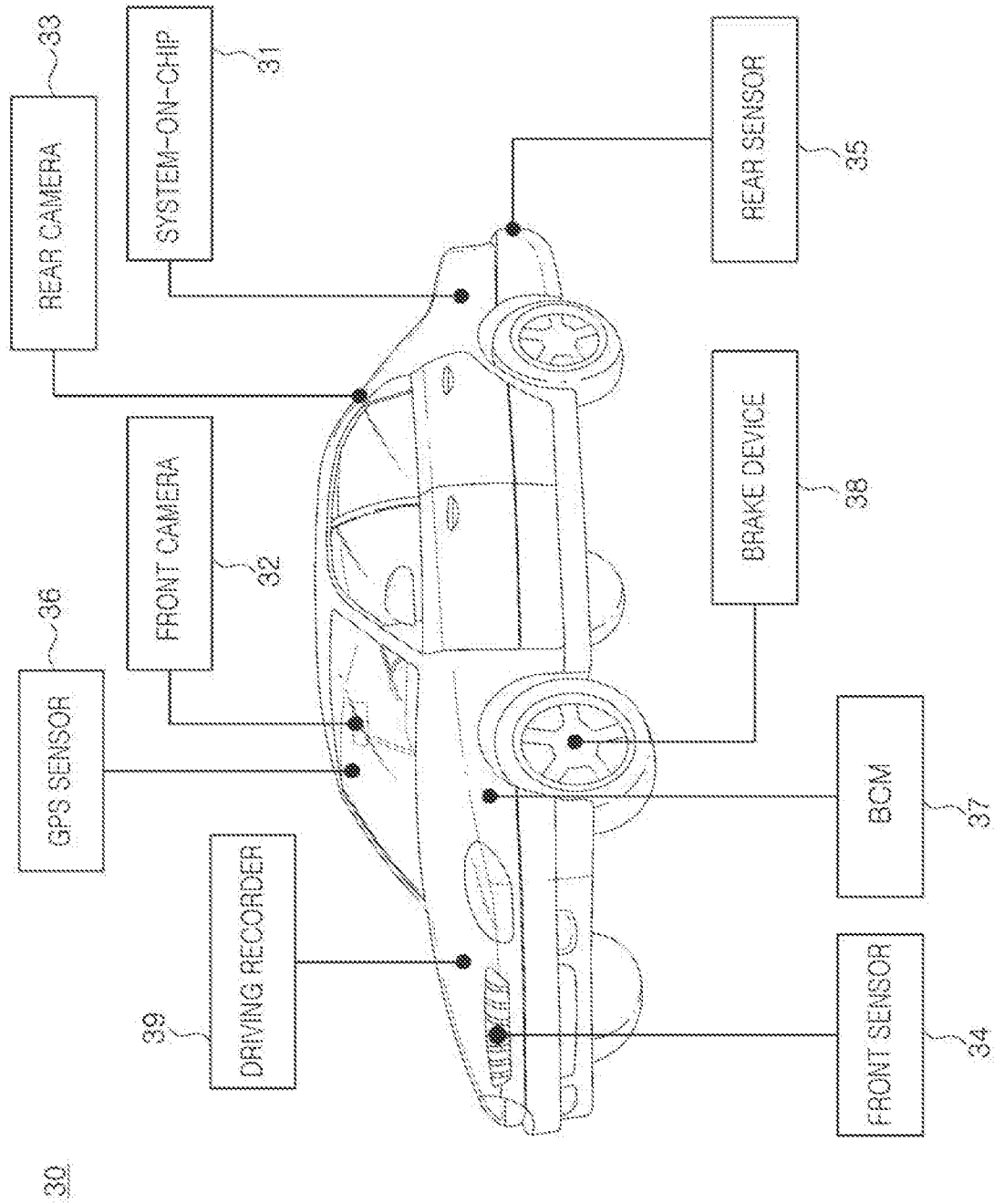

FIGS. 1A, 1B, and 2 are diagrams schematically illustrating apparatuses in which a system-on-chip according to an example embodiment may be mounted.

First, referring to FIGS. 1A and 1B, an apparatus in which a system-on-chip according to an example embodiment is mounted may be an electronic device 1. Referring to FIGS. 1A and 1B, the electronic device 1 is illustrated as being a smartphone, but in addition thereto, a system-on-chip according to an example embodiment may be mounted in various devices such as a desktop computer, a laptop computer, a tablet PC, and the like.

Referring to FIG. 1A, the electronic device 1 according to an example embodiment may include a case 2, a display 5 provided on a front surface of the case 2, front cameras 6 and 7, and the like. The display 5 is disposed on the front surface of the case 2 and may substantially cover the entire front surface of the case 2. For example, most of the front surface of the case 2 may be allocated to a display area of the display 5.

The front cameras 6 and 7 may have different angles of view, pixel numbers and aperture values, and a user may capture various types of images using the front cameras 6 and 7. For example, at least one of the plurality of front cameras 6 and 7 may be used for obtaining biometric information by recognizing a face, an iris, or the like of the user.

Next, referring to FIG. 1B, the electronic device 1 may include a case 2, a rear camera 8, and the like. Unlike the example embodiment illustrated in FIG. 1B, the rear camera 8 may include a plurality of cameras. In a case in which the rear camera 8 includes a plurality of cameras, the plurality of cameras may have different pixel numbers, angles of view, aperture values, and the like.

Inside the case 2 of the electronic device 1, various components may be mounted as illustrated in FIG. 1B. The components are components for implementing various functions of the electronic device 1 and examples of the components may include a semiconductor device, a circuit board, a battery, circuit devices, and the like. For example, a circuit board 10 may be mounted inside the case 2 of the electronic device 1, and various semiconductor devices including a system-on-chip 20, and circuit devices, may be mounted on the circuit board 10. The system-on-chip 20 may exchange data and/or power with other semiconductor devices, circuit devices, batteries, and the like through the circuit board 10.

In an example, the system-on-chip 20 may be an application processor, and in addition to a processor unit having cores that execute computational and control operations, may include a graphics processing unit (GPU) processing graphics, a memory controller controlling a dynamic random access memory (DRAM) and/or a flash memory, and IP units, which may include blocks of circuitry performing specific functions, such as an input/output interface connected to other semiconductor devices or the like. The processor unit and various IP units included in the system-on-chip 20 may exchange data with each other through a system bus inside the system-on-chip 20. For example, an IP unit may have a design that includes a trade secret.

The system-on-chip 20 according to an example embodiment may include an error detection unit actively detecting an error that may occur in a plurality of IP units included therein. The error detection unit may operate in a master-slave manner with the IP units inside the system-on-chip 20. For example, the error detection unit may act as a master device for the IP units, and the IP units may act as slave devices.

Each of the plurality of IP units may include a register that stores error information. The error detection unit may monitor the register in each of the IP units irrespective of the operating state of the IP units. Therefore, the error detection unit may actively detect the error information indicating the occurrence of an error in each of the IP units, and may quickly solve the error of the IP units by quickly transmitting the error information to the processor unit or the like.

Next, referring to FIG. 2, a system-on-chip 31 according to an example embodiment may be mounted on a vehicle 30. The vehicle 30 on which the system-on-chip 31 according to an example embodiment is mounted may be an autonomous vehicle capable of driving by itself without a driver's manipulation. In FIG. 2, the system-on-chip 31 is illustrated as being mounted at the rear of the vehicle 30, but an example embodiment thereof is not necessarily limited thereto.

The vehicle 30 may include various devices required for autonomous driving. For example, the vehicle 30 may include a front camera 32 and a rear camera 33 for capturing an external image, a front sensor 34 and a rear sensor 35 for detecting an object around the vehicle, a global positioning system (GPS) sensor 36 for detecting a position of the vehicle 30, and the like. In addition, a body control module (BCM) 37 that controls overall driving of the vehicle 30, a brake device 38, a driving recorder 39, and the like may be mounted in the vehicle 30.

The devices 32 to 39 mounted in the vehicle 30 may be controlled by the system-on-chip 31. The system-on-chip 31 may control the driving of the vehicle 30, based on surrounding information and location information collected through the front camera 32 and the rear camera 33, the front sensor 34 and the rear sensor 35, the GPS sensor 36 and the like. For example, the cameras, for example, the front and read cameras 32 and 33, may be implemented as a general image sensor or a time-of-flight (ToF) sensor, and the sensors, for example, the front and rear sensors 34 and 35, may include a radar device. The arrangement and the number of the cameras 32 and 33 and the sensors 34 and 35 may be variously modified according to example embodiments.

In the vehicle 30 having an autonomous driving function, an error occurring in the system-on-chip 31 may lead to a significant accident. For example, if an error occurring in a portion of IP units included in the system-on-chip 31 is not solved quickly, a traffic accident or the like may occur. In an example embodiment, unlike the related art method in which respective IP units output error information by themselves and inform a processor unit with an interrupt signal or the like, a separate error detection unit mounted in the system-on-chip 31 may actively detect error information of IP units. Accordingly, an interrupt signal is generated by IP units in which an error has occurred, and thus, whether or not an error has occurred may be determined faster than that in the related art method recognized by a processor unit, and stability and reliability of the system-on-chip 31 may be improved.

Figure 3:
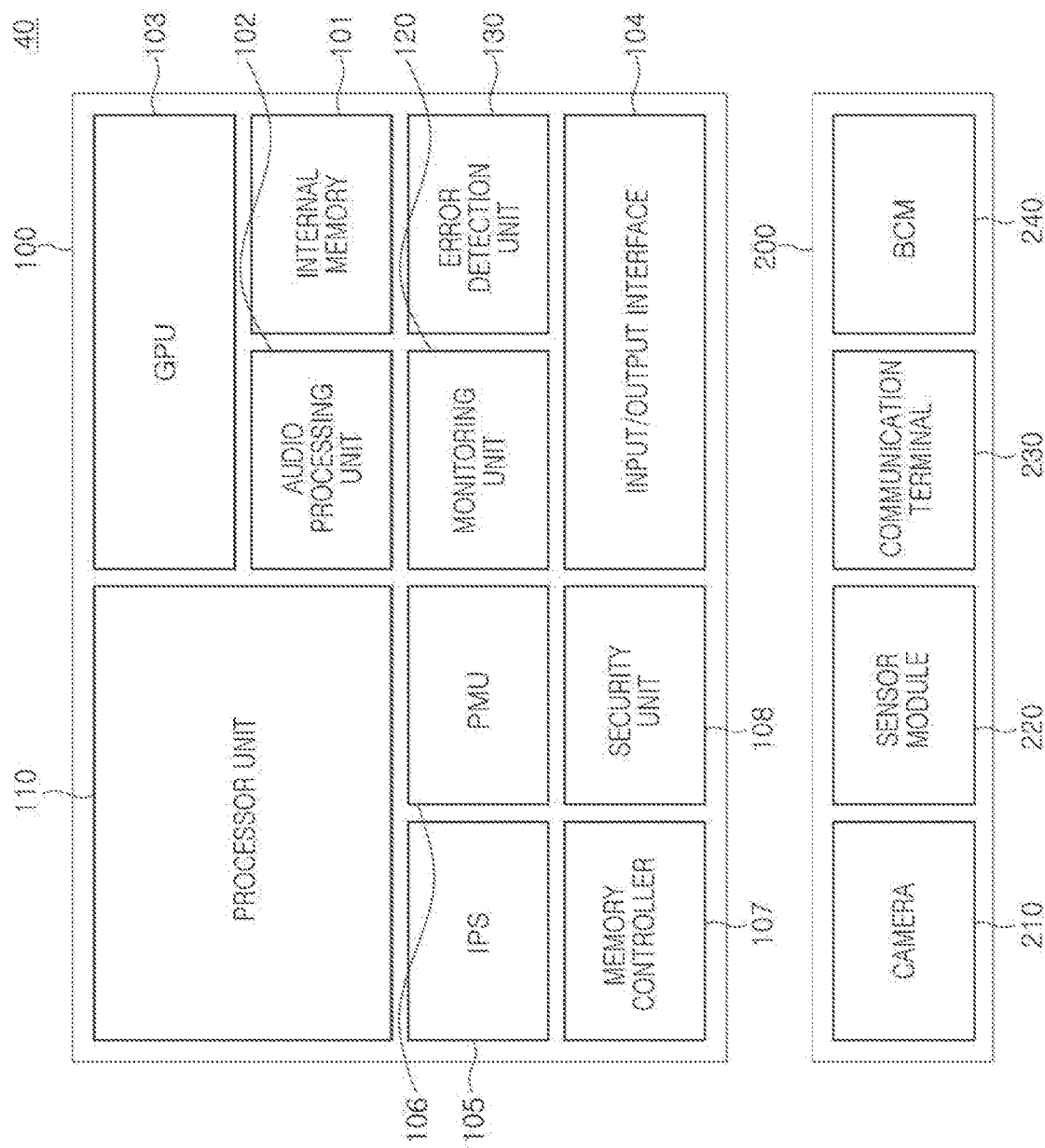
FIGS. 3 and 4 are schematic diagrams illustrating a system-on-chip according to an example embodiment.
Figure 4:
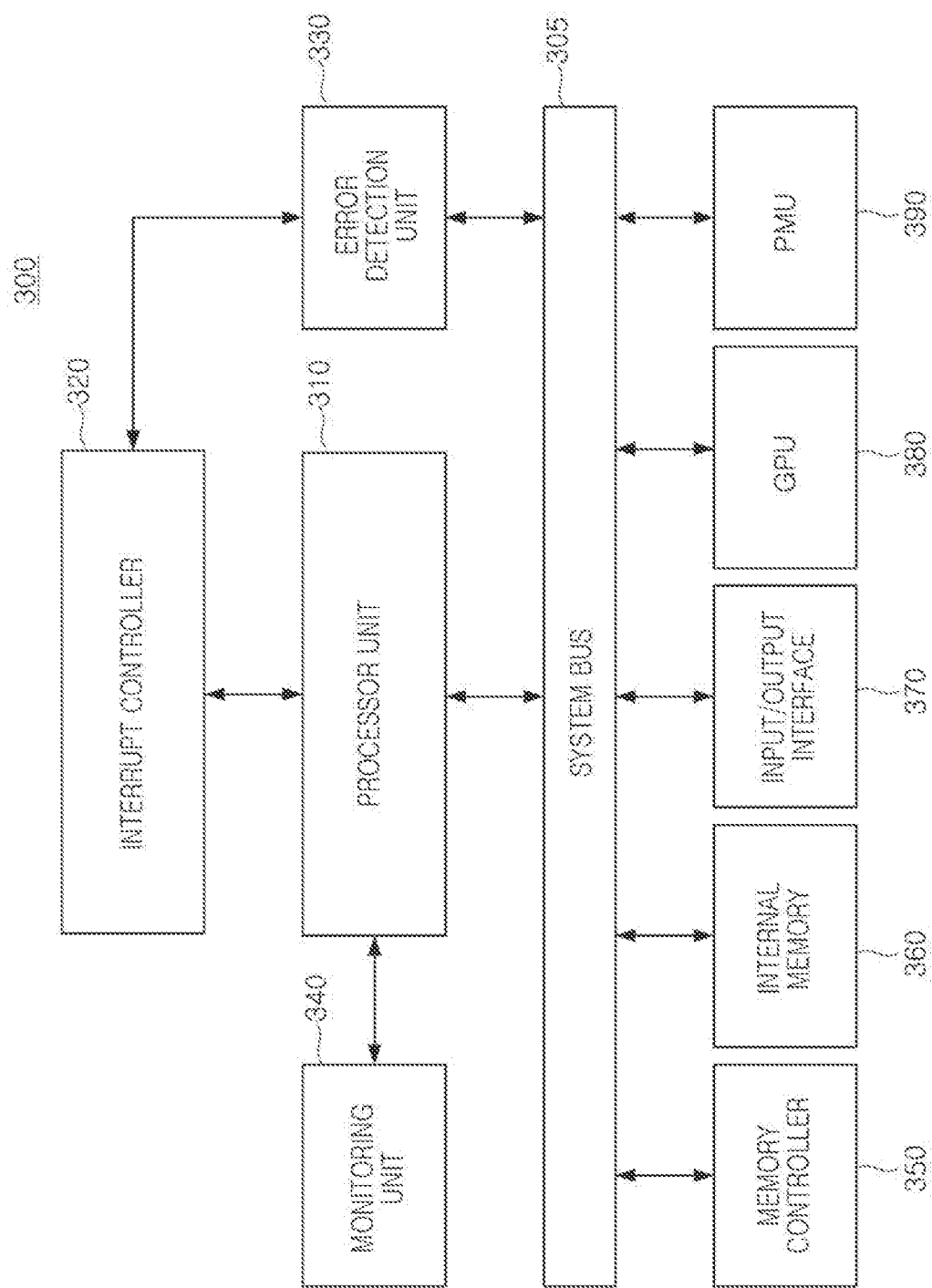

FIGS. 3 and 4 are schematic diagrams illustrating a system-on-chip according to an example embodiment.

Referring to FIG. 3, a system-on-chip 100 according to an example embodiment may be mounted in an electronic device 40 together with other peripheral devices 200. The electronic device 40 may correspond to various devices such as a home appliance, a server and an autonomous vehicle, in addition to a computer device such as a smartphone, a tablet PC, a desktop, and the like. The peripheral devices 200 may include a camera 210, a sensor module 220, a communication terminal 230, a vehicle body control module 240, and the like. The number and type of the peripheral devices 200 may vary depending on the type of electronic device 40.

The system-on-chip 100 may include a processor unit 110, a monitoring unit 120, an error detection unit 130, and other various IP units 101 to 108. The number and type of the IP units 101 to 108 may be changed depending on a function provided by the system-on-chip 100. For example, one or more additional IP units different from the IP units 101 to 108 may be added to the system-on-chip 100, or at least one of the IP units 101 to 108 may be removed from the system-on-chip 100. In the example embodiment illustrated in FIG. 3, the IP units (101 to 108) may include an internal memory 101, an audio processing unit 102, a graphics processing unit 103, an input/output interface 104, an image processing processor 105, a power management unit 106, a memory controller 107, a security unit 108, and the like.

The processor unit 110 may include one or more cores that perform operations and generate and process instructions. The processor unit 110 may control an overall operation of the system-on-chip 100. The processor unit 110 may be connected to the monitoring unit 120 including a watchdog timer circuit and the like.

The processor unit 110 may periodically reset the watchdog timer included in the monitoring unit 120. The monitoring unit 120 may determine that an error has occurred in the processor unit 110 when the watchdog timer is not reset at a predetermined cycle. In an example, the monitoring unit 120 may be implemented to be programmable. When it is determined that an error has occurred in the processor unit 110, the monitoring unit 120 may perform a process including a method of resetting the processor unit 110, re-supplying power after being disconnected, or activating a safe mode.

The error detection unit 130 may monitor a register in which error information is stored, and the register is included in each of the plurality of IP units 101 to 108. Each of the plurality of IP units 101 to 108 may have a register in which error information indicating whether an error has occurred is stored. The error detection unit 130 may operate as a master device for the plurality of IP units 101 to 108, and may detect whether an error has occurred by monitoring a register of each of the plurality of IP units 101 to 108 that operate as slave devices.

In general, each of the plurality of IP units 101 to 108 changes a value of the error information stored in a register when an error has occurred, and reports an error occurrence to the processor unit 110 or a separate error processing unit using an interrupt signal or the like. Therefore, it may take additional time until the error occurrence is transmitted to the processor unit 110, the error processing unit, or the like.

The plurality of IP units 101 to 108 may notify the processor unit 110 that an error has occurred through an interrupt controller connected to the processor unit 110, or may notify the processor unit 110 and/or the error processing unit that an error has occurred via a system bus. Therefore, in a case in which an error also occurs in an interrupt controller or a system bus, the error occurrence may not be normally notified to the processor unit 110 and/or the error processing unit.

Thus, in an example embodiment, the error detection unit 130 may actively monitor a register in which error information is stored in each of the plurality of IP units 101 to 108. The error detection unit 130 operates as a master device for the plurality of IP units 101 to 108, and may monitor a register in which error information is stored regardless of whether the plurality of IP units 101 to 108 are actually operating. For example, the error detection unit 130 may monitor the register even when the plurality of IP units 101 to 108 are in an idle state.

Therefore, in the system-on-chip 100 according to an example embodiment, an error occurrence of each of the plurality of IP units 101 to 108 may be quickly detected and processed. The error detection unit 130 may notify the processor unit 110 and/or the error processing unit of information of an IP unit determined to have an error among the plurality of IP units 101 to 108. In an example embodiment, the error detection unit 130 may notify the information of the IP unit in which the error has occurred through an interrupt controller or a system bus. In addition, when it is also determined that an error has occurred in the interrupt controller or the system bus, the error detection unit 130 may directly notify the processor unit 110 and/or the error processing unit of the information of the IP unit in which the error has occurred.

Next, referring to FIG. 4, a system-on-chip 300 according to an example embodiment may include a system bus 305, a processor unit 310, an interrupt controller 320, an error detection unit 330, a monitoring unit 340, and other various IP units 350 to 390. In the example embodiment illustrated in FIG. 4, the IP units (350 to 590) may include a memory controller 350, an internal memory 360, an input/output interface 370, a graphics processing unit 380, a power management unit 390, and the like.

The processor unit 310 may exchange data with the IP units 350 to 390 through the system bus 305. The interrupt controller 320 may generate an interrupt signal by receiving a request of the processor unit 310 and the IP units 350 to 390. The error detection unit 330 may determine whether an error has occurred in the respective IP units 350 to 390 by monitoring a register in which error information is stored in each of the IP units 350 to 390.

The monitoring unit 340 may include a watchdog timer circuit and the like. The monitoring unit 340 may communicate directly with the processor unit 310 without going through the system bus 305, and may determine that an error has occurred in the processor unit 310 when the watchdog timer is not reset by the processor unit 310 at a predetermined period or timing.

In an example embodiment, the error detection unit 330 may monitor the register even when the IP units 350 to 390 are in an idle state. For example, when error information is detected as an error state in a register of the IP units 350 to 390 that are in an idle state, the error detection unit 330 may notify the processor unit 310 of the error information. In detail, before the IP units 350 to 390 are switched from the idle state to an active mode, the processor unit 310 may process an error, and the IP units 350 to 390 are activated and may operate normally. Therefore, the reliability of the system-on-chip 300 may be improved.

The error detection unit 330 may also detect whether an error occurs in the system bus 305 and the interrupt controller 320. As an example, when it is detected that an error has occurred, based on an error information of a register of at least one of the IP units 350 to 390, the error detection unit 330 may request that the interrupt controller 320 generate an interrupt. When the interrupt controller 320 receives the request of the error detection unit 330, the interrupt controller 320 may transmit information of the IP unit in which the error has occurred to the processor unit 310, and the processor unit 310 may process the error occurring in the IP unit and may initialize error information stored in the register. For example, when the interrupt controller 320 does not operate normally and the interrupt is not generated despite the request, the error information stored in the register of the IP units 350 to 390 in which the error has occurred may not be initialized.

In this case, in an example embodiment, after the error detection unit 330 detects error information from the register of at least one of the IP units 350 to 390 and transmits an interrupt generation request to the interrupt controller 320, when the error information of the register is not initialized during a predetermined period of time, it may be determined that an error has occurred in the interrupt controller 320. In this case, the error detection unit 330 may directly notify the processor unit 310 of an abnormal state of the IP units 350 to 390 in which the error information is detected as an error state, without passing through the interrupt controller 320. The processor unit 310 may execute a process of restarting the interrupt controller 320 by controlling the power management unit 390 to solve the abnormal state of the interrupt controller 320.

In addition, for example, when an error occurs in the system bus 305, after the error detection unit 330 detects an error information and requests that the interrupt controller 320 generate an interrupt, the error information may not be initialized for a predetermined period of time. In this case, the error detection unit 330 may notify the processor unit 310 of the abnormality of the system bus 305. The processor unit 310 may apply a process such as restarting the system bus 305 through the power management unit 390 to solve the abnormal state of the system bus 305.

In an example embodiment, the error detection unit 330 may operate based on a code expressed in hardware form available at a Register Transfer Level (RTL) or a gate level at which a gate to perform the function is implemented. Accordingly, the error detection unit 330 may monitor a register in which the error information is stored in the IP units 350 to 390 without increasing a resource of the system-on-chip 300.

Figure 5:
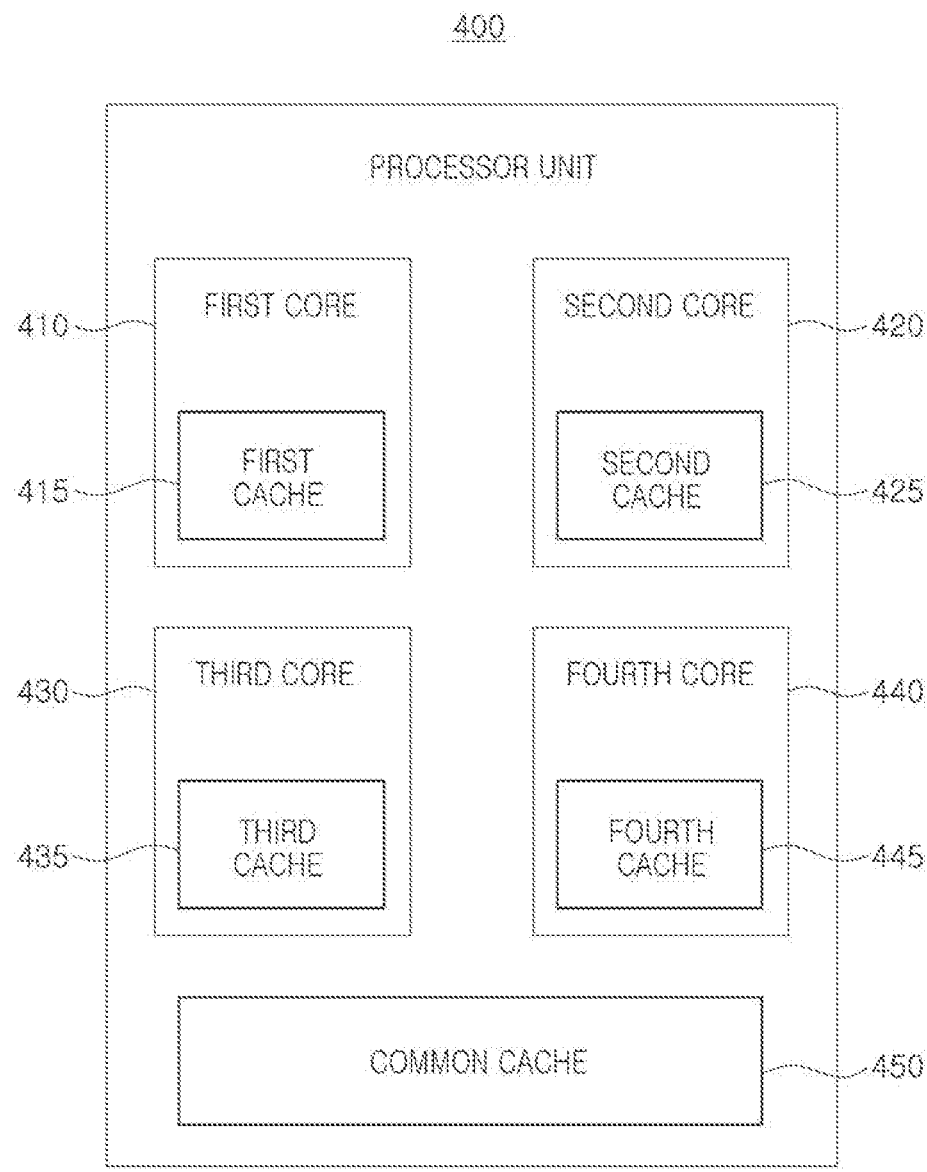
FIG. 5 is a diagram schematically illustrating a processor unit included in a system-on-chip according to an example embodiment.

FIG. 5 is a diagram schematically illustrating a processor unit included in a system-on-chip according to an example embodiment.

Referring to FIG. 5, a processor unit 400 according to an example embodiment may include a plurality of cores 410 to 440. The plurality of cores 410 to 440 may include a first core 410, a second core 420, a third core 430 and a fourth core 440. The plurality of cores 410 to 440 may perform a function such as executing an operation or generating and processing an instruction. The number of cores 410 to 440 included in the processor unit 400 may vary according to example embodiments, and the cores 410 to 440 may have the same or different architectures.

The plurality of cores 410 to 440 may include cache memories 415 to 445, respectively. The first core 410 may include a first cache 415, the second core 420 may include a second cache 425, the third core 430 may include a third cache 435, and the fourth core 440 may include a fourth cache 445. The processor unit 400 may include a common cache memory 450 shared by the plurality of cores 410 to 440. The cache memories 415 to 445 and the common cache memory 450 may be implemented by the same or different types of memories. In an example, the cache memories 415 to 445 and the common cache memory 450 may be all implemented as dynamic random access memories (DRAMs), or the cache memories 415 to 445 may be implemented as static random access memories (SRAMs) and the common cache memory 450 may be implemented by a dynamic random access memory (DRAM). A storage capacity of the common cache memory 450 may be greater than a storage capacity of each of the cache memories 415 to 445. The common cache memory 450 and the cache memories 415 to 445 may be used to improve the speed of exchanging data with a main memory outside the system-on-chip.

Figure 6:
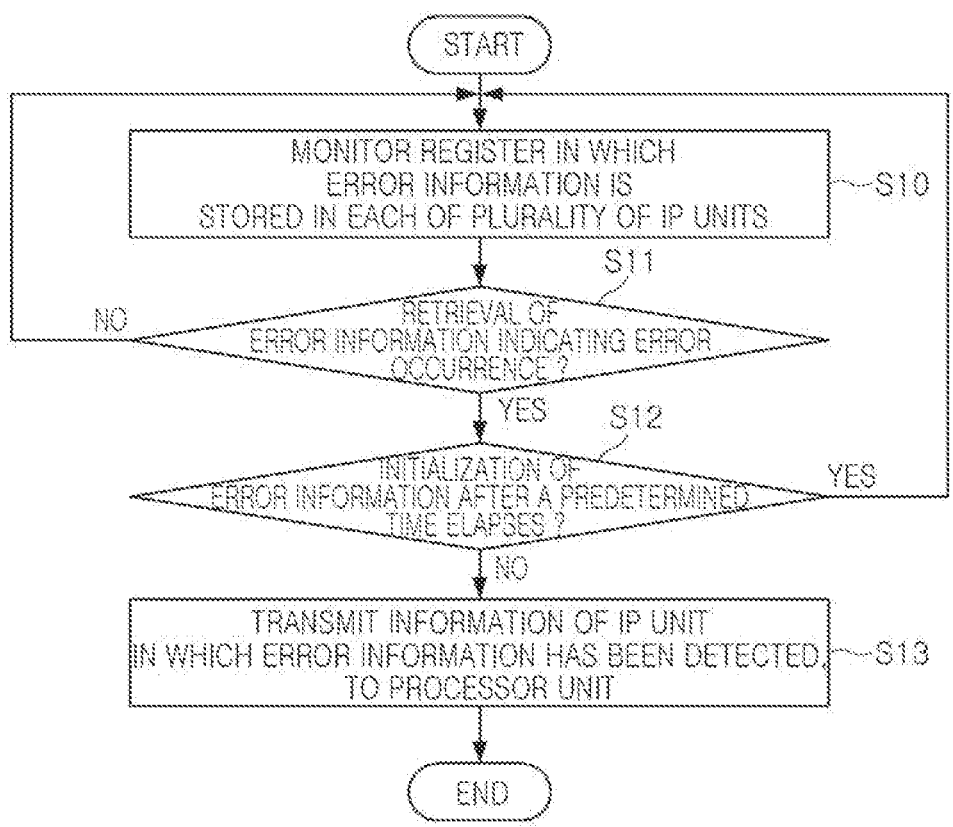
FIGS. 6 to 8 are flowcharts illustrating a method of operating a system-on-chip according to example embodiments.
Figure 7:
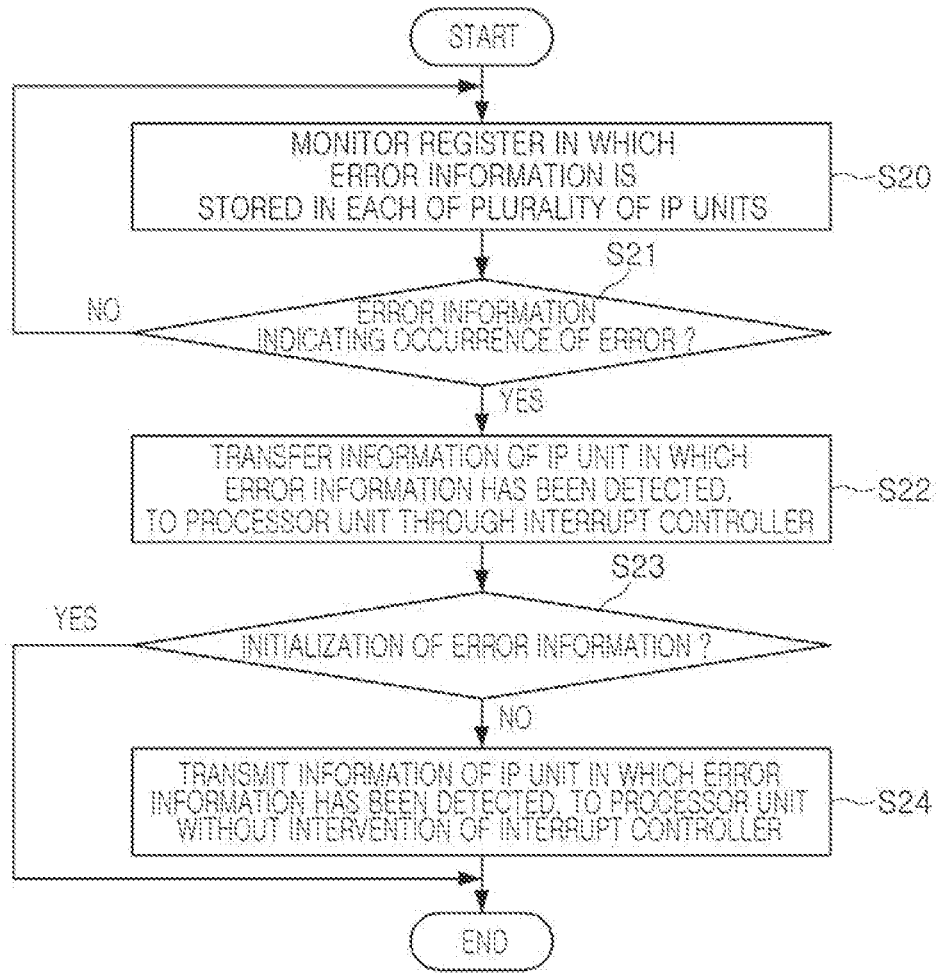
Figure 8:
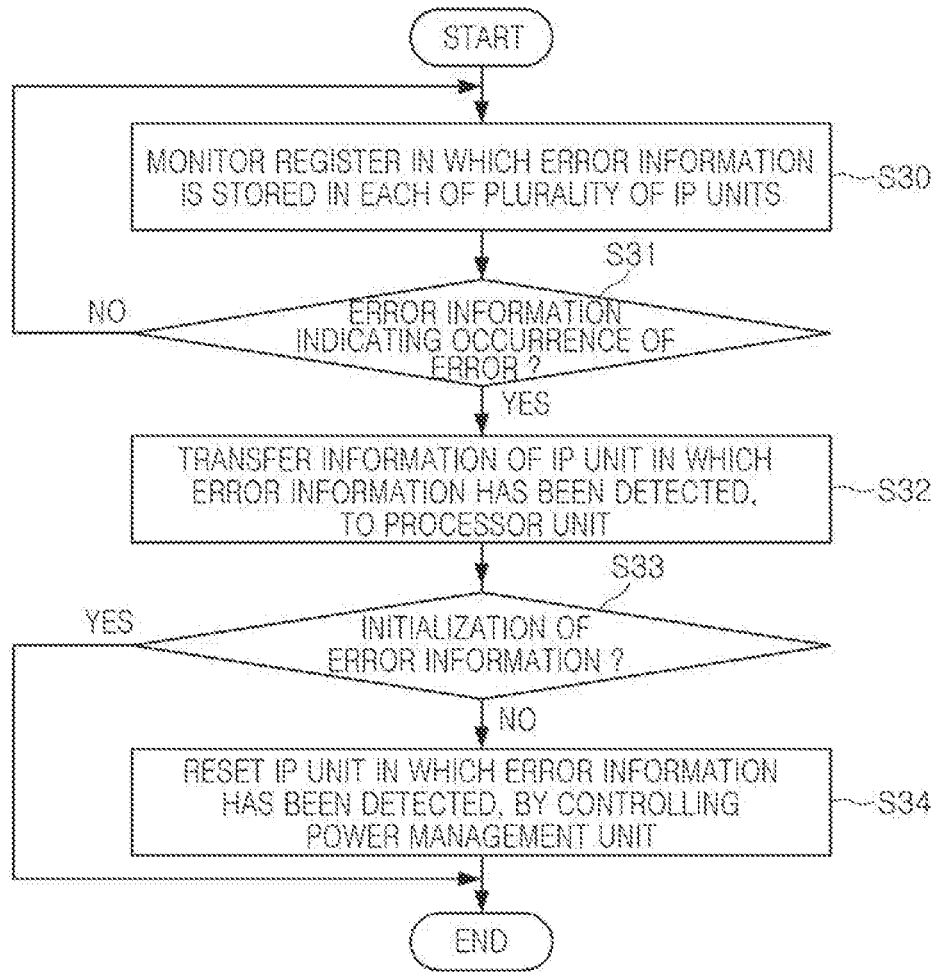

FIGS. 6 to 8 are flowcharts illustrating a method of operating a system-on-chip according to example embodiments.

First, referring to FIG. 6, a method of operating a system-on-chip according to an example embodiment include an error detection unit monitoring a register in which error information is stored in each of a plurality of IP units (S10). Each of the IP units may update a register in which error information is stored when an error has occurred. The error detection unit may determine whether error information indicating an error occurrence is retrieved from the register of each of the IP units (S11).

When an error has occurred in at least one of the IP units, the IP unit may update the register so that the error information indicates an error occurrence, and may notify a processor unit that the error has occurred through an interrupt controller or the like. When the processor unit is normally notified that an error has occurred, the processor unit may handle the error of the IP unit and return the error information stored in the register to the initial state.

The error detection unit may retrieve the error information and may determine whether the error information stored in the register is initialized after a predetermined time has elapsed (S12). When the error information of the IP unit is normally notified to the processor unit and the error is resolved, the error detection unit may confirm that the error information has been initialized in operation S12. On the other hand, when the error of the IP unit is not resolved due to a problem of an interrupt controller, a system bus, or other components, the error detection unit may confirm that the error information is not initialized in operation S12.

When it is determined in operation S12 that the error information has not initialized after the predetermined time has elapsed, the error detection unit may transmit information of the IP unit in which the error information has been detected, to the processor unit (S13). For example, in operation S13, the error detection unit may directly transmit information of the IP unit in which the error information has been detected, to the processor unit without intervention of the interrupt controller. Alternatively, the error detection unit may request a power management unit or the like to perform an operation such as resetting the IP unit in which the error information has been detected or the like.

Next, referring to FIG. 7, a method of operating a system-on-chip according to an example embodiment may include an error detection unit monitoring a register in which error information is stored in each of a plurality of IP units (S20). The monitoring operation of operation S20 may be applied not only to activated IP units that exchange data with a processor unit and the like through a system bus, but also to IP units in an idle state, which are not activated.

In detail, an example embodiment employs an operating manner in which the error detection unit operates as a master device for the IP units to actively monitor the register in which the error information is stored, not a manner in which IP units determine whether an error has occurred by themselves and change error information stored in a register and then output the information when an error has occurred. Therefore, whether an error has occurred may be quickly determined, and in a case in which an error occurs in IP units in an idle state, the error may be proactively processed before the IP units are activated, thereby preventing malfunctioning of the system-on-chip in advance.

The error detection unit may determine whether error information stored in a register of at least one of the IP units indicates the occurrence of an error, during the monitoring operation (S21). When error information indicating the occurrence of an error is not detected as a result of the determination in operation S21, the monitoring operation may continue. When error information indicating the occurrence of an error is detected in operation S21, the error detection unit may transfer information of the IP unit in which the error information indicating the occurrence of an error has been detected, to the processor unit through an interrupt controller (S22).

As an example, in operation S22, the error detection unit may request that the interrupt controller generate an interrupt for notifying the information of the IP unit in which error information indicating the occurrence of an error has been detected. The processor unit receiving the interrupt from the interrupt controller may process an error occurring in the IP unit and may initialize the error information stored in the register. The error detection unit may determine whether the error information is initialized in the register of the IP unit in which the error information indicating the occurrence of the error has been detected (S23).

When the error information is initialized in operation S23, the error detection unit may end the error processing operation without any additional operation. On the other hand, when the error information is not initialized in operation S23, the error detection unit may determine that an error has occurred in the interrupt controller. Therefore, the error detection unit may directly transmit information of the IP unit in which the error information has been detected, to the processor unit without intervention of the interrupt controller (S24).

Next, referring to FIG. 8, a method of operating a system-on-chip according to an example embodiment may include an error detection unit monitoring a register in which error information is stored in each of a plurality of IP units (S30). Similarly as described with reference to FIG. 7, the monitoring operation of operation S20 may be applied to IP units in an idle state, which are not activated, as well as activated IP units.

During the monitoring operation, the error detection unit may determine whether error information stored in a register of at least one of IP units indicates an error occurrence (S31). When error information indicating the occurrence of an error is not detected as a result of the determination in operation S31, the monitoring operation may continue. When error information indicating the occurrence of an error is detected in operation S31, the error detection unit may transfer information of the IP unit in which the error information has been detected, to a processor unit through the interrupt controller (S32).

When the interrupt controller receives a request of the error detection unit and transmits information of the IP unit in which the error has occurred, to the processor unit, the processor unit may process an error occurring in the IP unit and may initialize error information stored in the register. The error detection unit may determine whether the error information is initialized in the register of the IP unit in which the error has occurred (S33).

When the error information is initialized in operation S33, the error detection unit may end the error processing operation without any additional operation. On the other hand, when the error information is not initialized in operation S33, the error detection unit may forcibly reset the IP unit in which the error information has been detected (S34). As an example, the error detection unit may perform the reset operation of operation S34 by forcibly restarting the IP unit in which the error has occurred, through a power management unit mounted on the system-on-chip.

The operations according to the example embodiments described with reference to FIGS. 6 to 8 may also be combined with each other. For example, the reset operation of operation S34 described with reference to FIG. 8 may be performed after the operation S13 described with reference to FIG. 6 and/or the operation of operation S24 described with reference to FIG. 7. In the example embodiment illustrated in FIG. 7, the error detection unit may determine whether the error information is initialized by monitoring the register of the IP unit in which the error has occurred after executing the operation of operation S24. When the error information is not initialized, the error detection unit may determine that an abnormality has occurred in the system bus or the like, and may execute the reset operation of operation S34 of forcibly resetting the IP unit in which the error has occurred.

Figure 9:
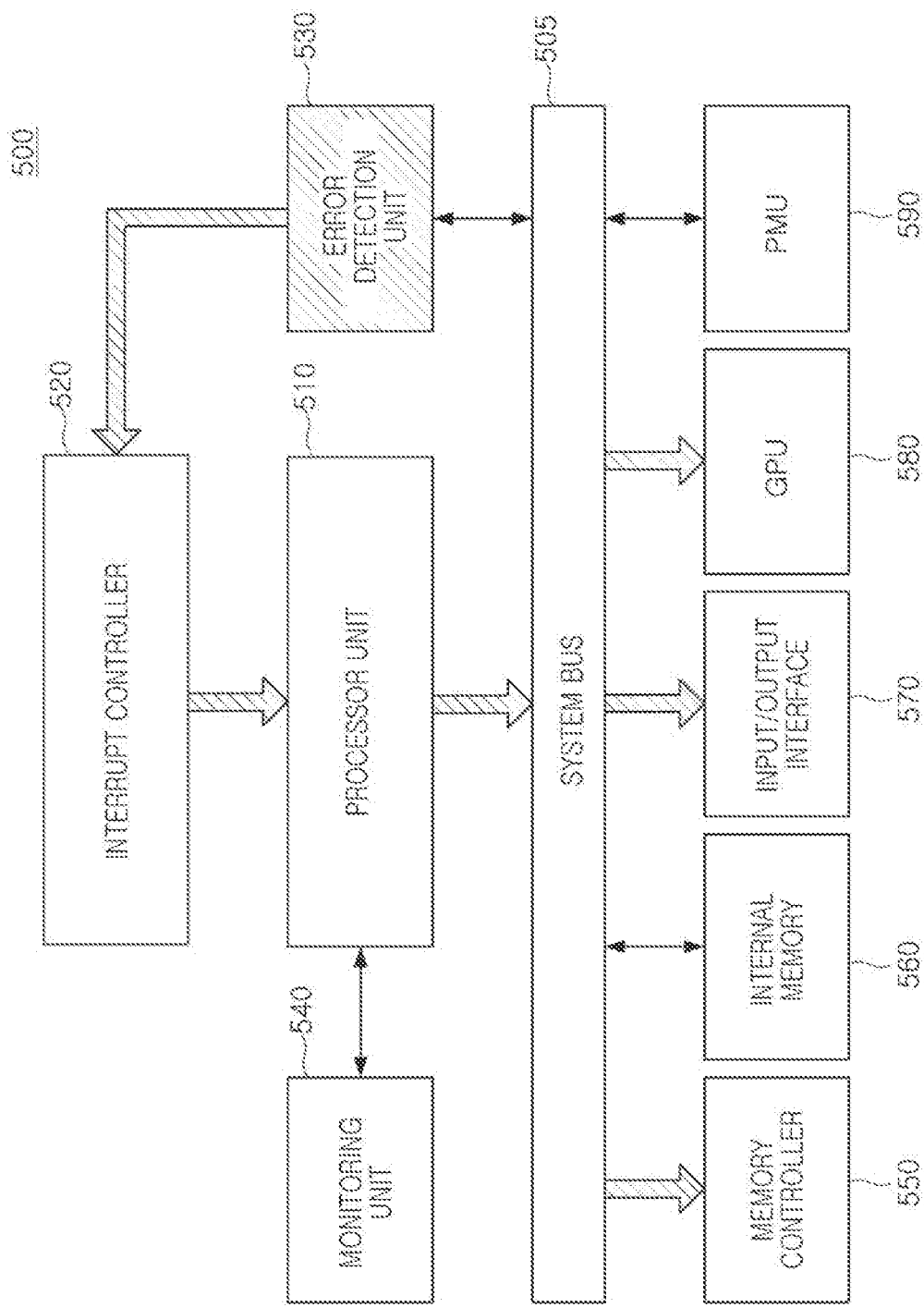
FIGS. 9 and 10 are diagrams illustrating a method of operating a system-on-chip according to an example embodiment.
Figure 10:
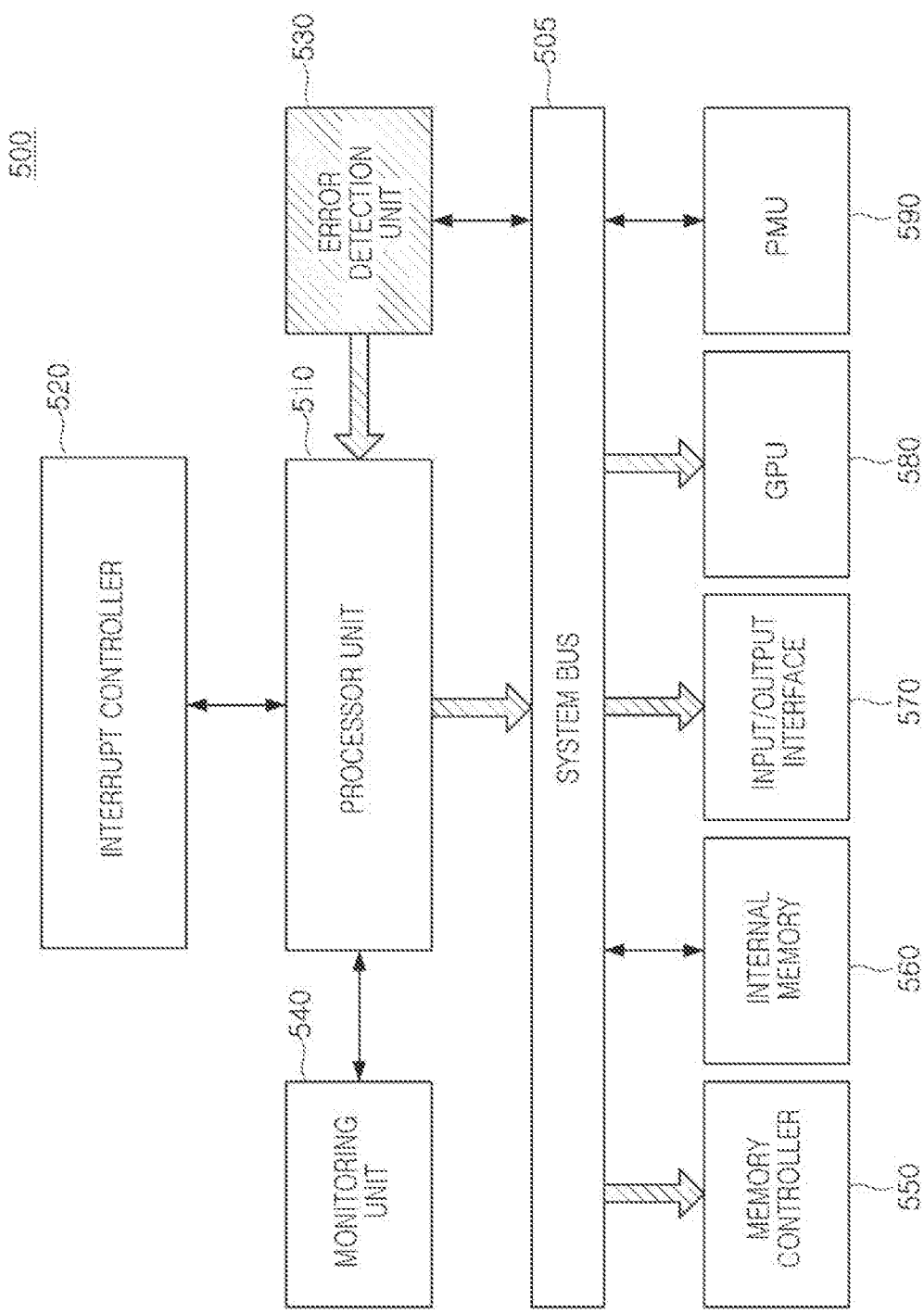
Figure 11:
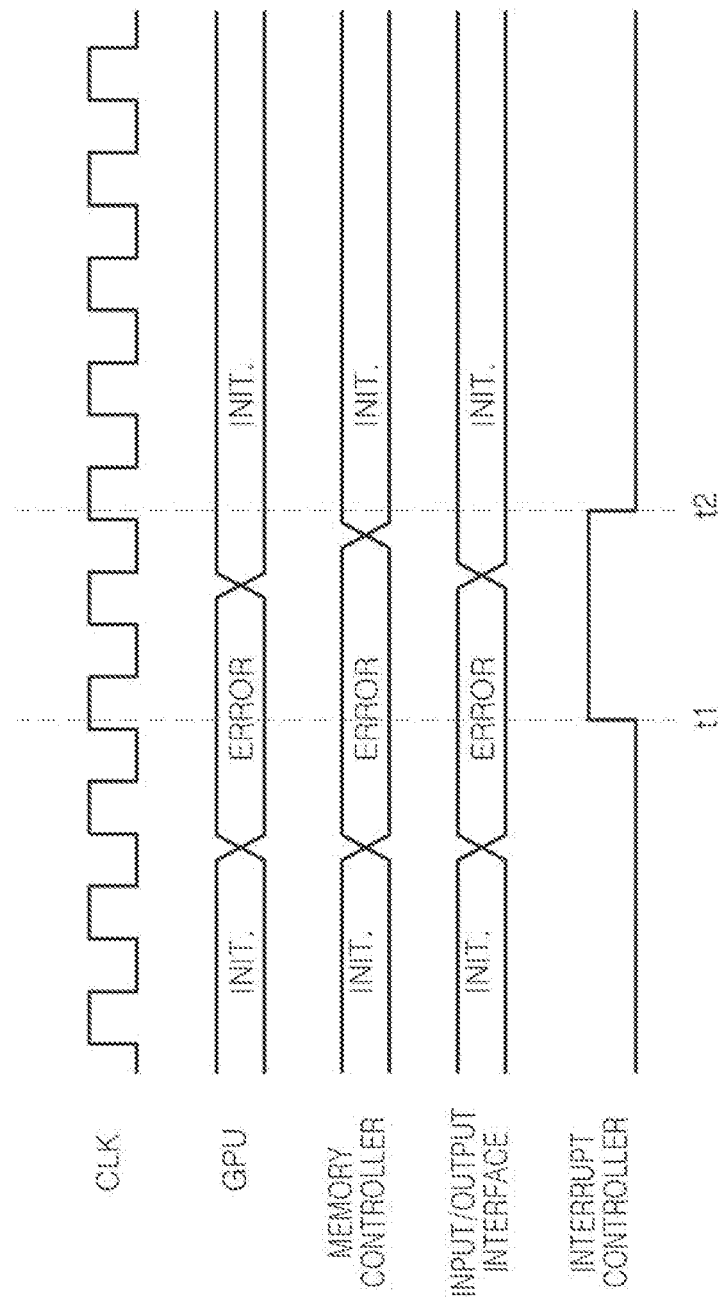
FIGS. 11 and 12 are timing diagrams illustrating a method of operating a system-on-chip according to an example embodiment.
Figure 12:
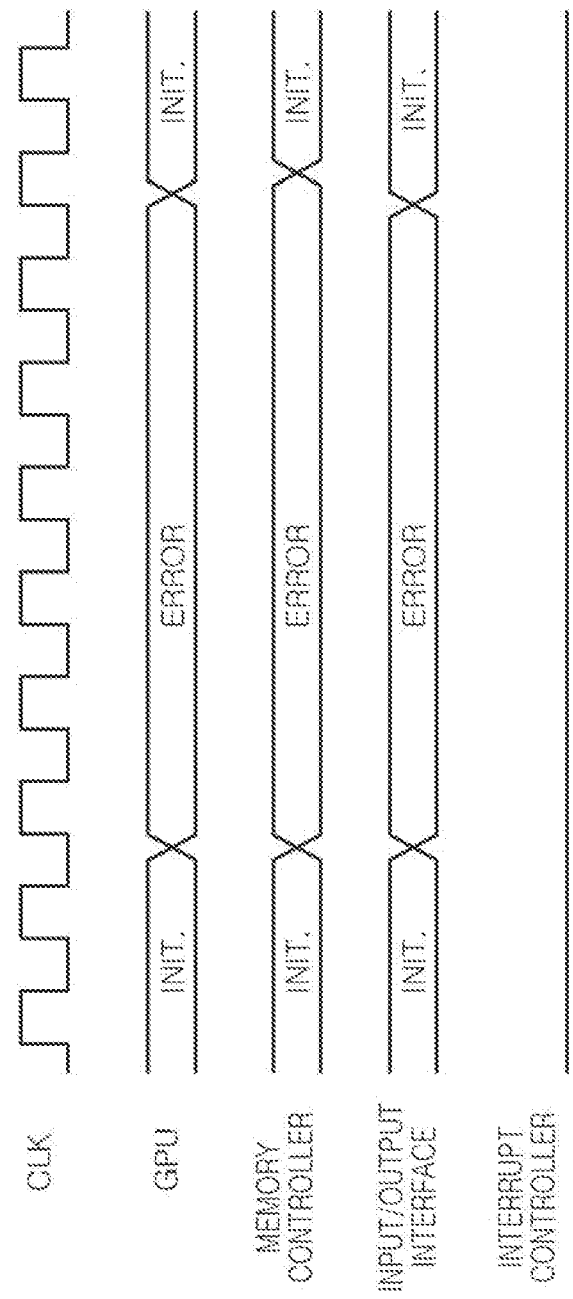

FIGS. 9 and 10 are diagrams illustrating a method of operating a system-on-chip according to an example embodiment. FIGS. 11 and 12 are timing diagrams illustrating a method of operating a system-on-chip according to an example embodiment.

A system-on-chip 500 according to an example embodiment illustrated in FIGS. 9 and 10 may include a system bus 505, a processor unit 510, an interrupt controller 520, an error detection unit 530, a monitoring unit 540, and a plurality of IP units 550 to 590.

Referring first to FIG. 9, the error detection unit 530 may monitor a register in which error information is stored in each of the IP units 550 to 590. The IP units 550 to 590 may include memory controller 550, internal memory 560, input/output interface 570, graphics processing unit 580 and power management unit 590. When error information indicating an error occurrence is detected in a register of at least one of the IP units 550 to 590, the error detection unit 530 may request that the interrupt controller 520 generate an interrupt. When the interrupt is normally generated and delivered to the processor unit 510, the processor unit 510 may process the error of the IP units 550 to 590 in which error information has been detected, for example, the error of a memory controller 550, an input/output interface 570, a graphics processing unit 580, and the like and may initialize the error information.

FIG. 11 is a timing diagram illustrating an operation of the system-on-chip 500 illustrated in FIG. 9. Referring to the timing diagram of FIG. 11, the state of the register in which error information is stored in each of the memory controller 550, the input/output interface 570, and the graphics processing unit 580 is illustrated together with an internal clock signal CLK of the system-on-chip 500.

For example, when an error occurs in the memory controller 550, the input/output interface 570, and the graphics processing unit 580, each of the memory controller 550, the input/output interface 570, and the graphics processing unit 580 may change error information stored in a register from an initial state (INIT.) to an error state (ERROR). The error detection unit 530 may detect that the error information has changed to the error state ERROR, and may request that the interrupt controller 520 generate an interrupt.

Upon receiving the interrupt generation request, the interrupt controller 520 may output the interrupt to the processor unit 510 at a first time point t1. Upon receiving the interrupt, the processor unit 510 may process an error occurring in the memory controller 550, the input/output interface 570 and the graphics processing unit 580, and may initialize the error information of the register to an initial state (INIT.). When the error information returns to the initial state (INIT.), the interrupt output of the interrupt controller 520 may also be initialized at a second time point t2.

Next, in an example embodiment illustrated in FIG. 10, when error information indicating an error occurrence is detected in a register of at least one of the IP units 550 to 590, the error detection unit 530 may directly transmit the error information to the processor unit 510 without passing through the interrupt controller 520. The example embodiment illustrated in FIG. 10 may correspond to a case in which an error occurs in the interrupt controller 520 and the interrupt is not output to the processor unit 510 despite the request of the error detection unit 530.

As an example, the error detection unit 530 may transmit information of the units in which error information indicating an error occurrence has been detected, among the IP units 550 to 590, for example, the information of the memory controller 550, the input/output interface 570 and the graphics processing unit, directly to the processor unit 510. The processor unit 510 may process errors of the memory controller 550, the input/output interface 570, and the graphics processing unit 580, and initialize error information of the register.

FIG. 12 is a timing diagram illustrating an operation of the system-on-chip 500 illustrated in FIG. 10. Referring to the timing diagram of FIG. 12, the state of a register in which error information is stored in each of the memory controller 550, the input/output interface 570, and the graphics processing unit 580 is illustrated together with the internal clock signal CLK of the system-on-chip 500.

In the example embodiment illustrated in FIG. 12, the error detection unit 530 detects error information from the memory controller 550, the input/output interface 570 and the graphics processing unit 580, and may request that the interrupt controller 520 generate an interrupt. However, as in the example case described above, due to an abnormality occurring in the interrupt controller 520, the interrupt may not be transmitted from the interrupt controller 520 to the processor unit 510.

After the error detection unit 530 requests that the interrupt controller 520 generate an interrupt, the error detection unit 530 may monitor a register in which error information is stored in each of the memory controller 550, the input/output interface 570, and the graphics processing unit 580. When the error information stored in the register maintains the error state (ERROR) even after requesting the interrupt generation and a predetermined time has elapsed, the error detection unit 530 may directly notify the processor unit 510 of the occurrence of error without passing through the interrupt controller 520.

Alternatively, the error detection unit 530 may request the interrupt controller 520 to generate an interrupt and may monitor the output of the interrupt controller 520. When the interrupt is not output from the interrupt controller 520 even after requesting to generate an interrupt and a predetermined time has elapsed, the error detection unit 530 directly notifies the processor unit 510 that the error has occurred without passing through the interrupt controller 520. The processor unit 510 notified of the error occurrence may process an error of the IP units 550, 570 and 580 in which the error has occurred, and may return the error information stored in the register to the initial state (INIT.).

Figure 13:
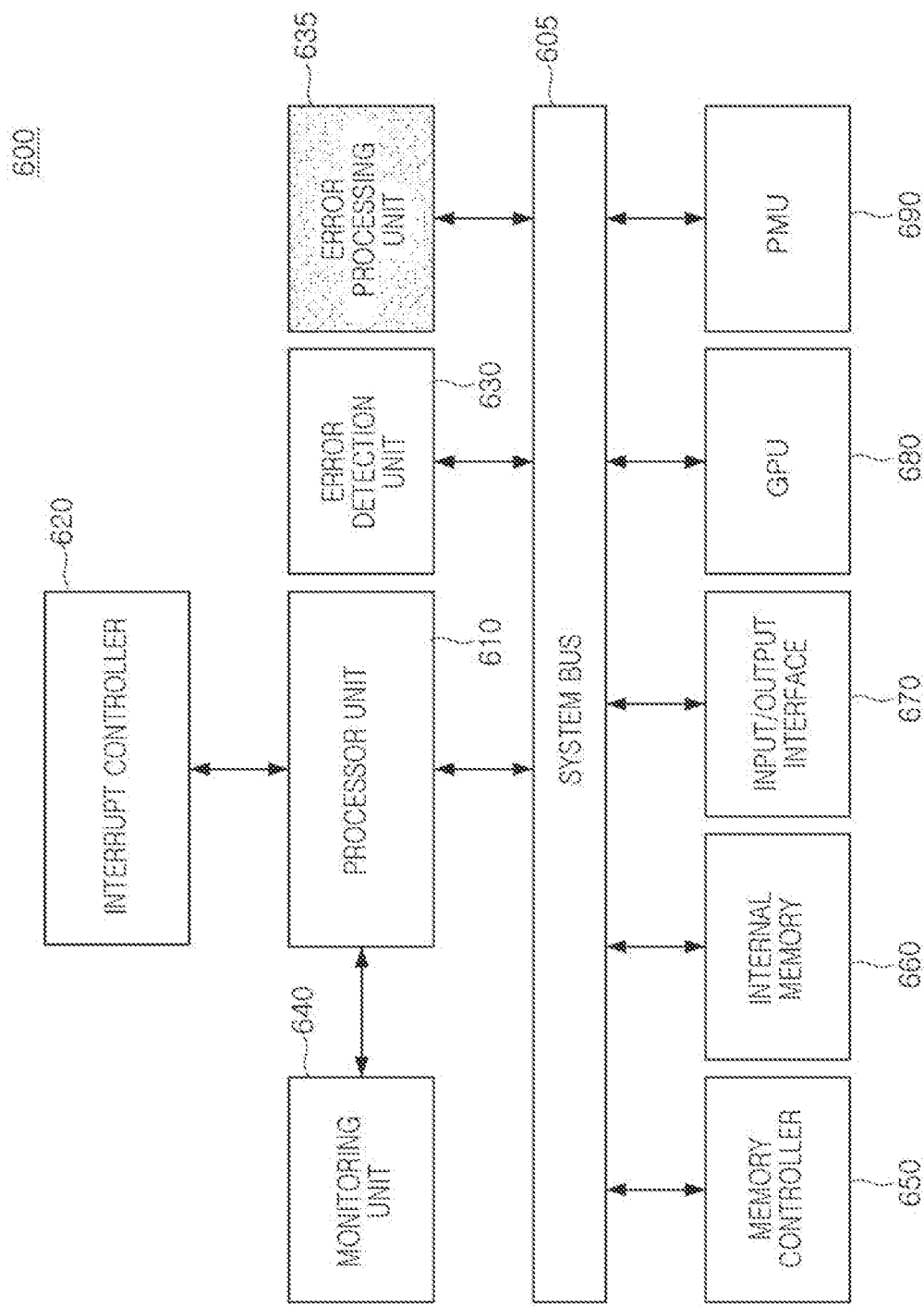
FIG. 13 is a diagram schematically illustrating a system-on-chip according to an example embodiment.

FIG. 13 is a diagram schematically illustrating a system-on-chip according to an example embodiment.

Referring to FIG. 13, a system-on-chip 600 according to an example embodiment may include a system bus 605, a processor unit 610, an interrupt controller 620, an error detection unit 630, and an error processing unit 635, a monitoring unit 640, and other various IP units 650 to 690. In an example embodiment illustrated in FIG. 13, the IP units (650 to 690) may include a memory controller 650, an internal memory 660, an input/output interface 670, a graphics processing unit 680, a power management unit 690, and the like.

The system-on-chip 600 according to the example embodiment illustrated in FIG. 13 may include an error processing unit 635 operating in an operating system different from that of the processor unit 610. Cores included in the processor unit 610 and the error processing unit 635, respectively, may have different architectures. Therefore, even in a case in which an abnormality occurs in the processor unit 610, the error processing unit 635 may operate normally.

The error processing unit 635 may handle an error occurring in each of the IP units 650 to 690. The error processing unit 635 may process an error in the IP units 650 to 690 in which an error has occurred, or may restart the IP units 650 to 690 in which the error has occurred. The error processing unit 635 may have control authority for the power management unit 690, to restart the IP units 650 to 690 in which the error has occurred.

Figure 14:
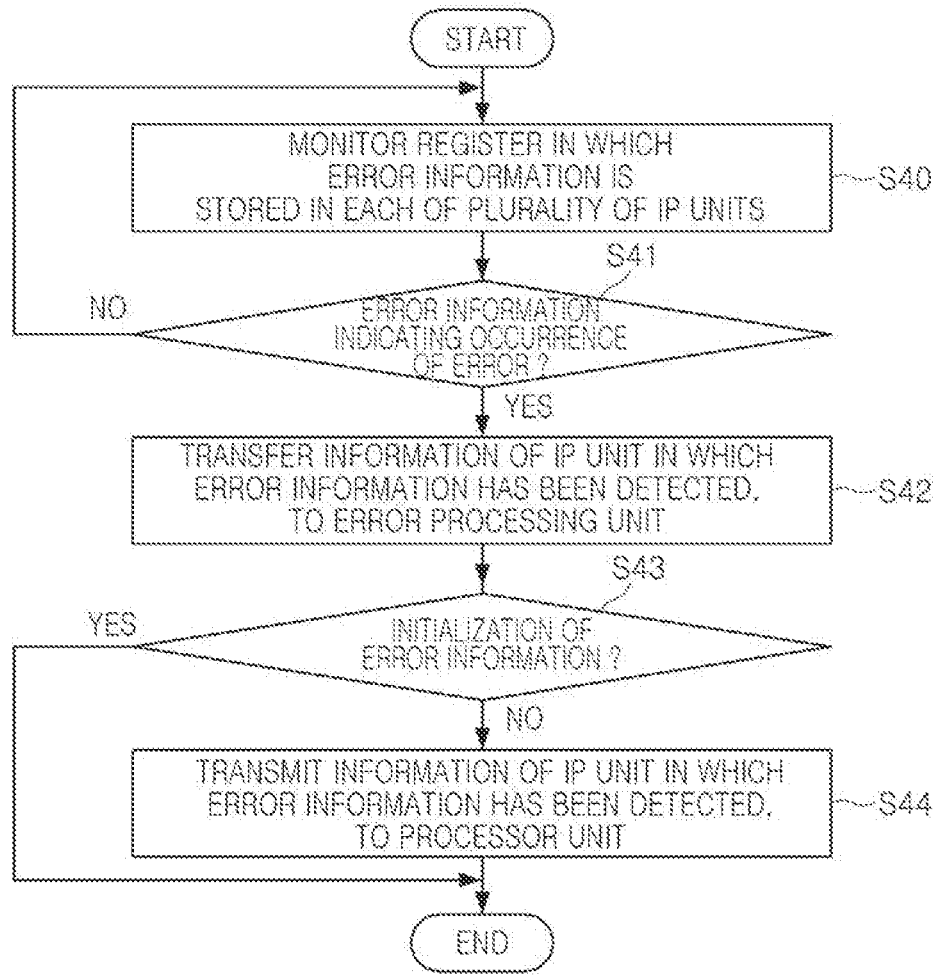
FIG. 14 is a flowchart illustrating a method of operating a system-on-chip according to an example embodiment.

FIG. 14 is a flowchart illustrating a method of operating a system-on-chip according to an example embodiment.

Referring to FIG. 14, a method of operating a system-on-chip according to an example embodiment may include an error detection unit monitoring a register in which error information is stored in each of a plurality of IP units (S40). The monitoring operation of operation S40 may be applied to IP units in an idle state, which are not activated, as well as activated IP units that exchange data with the processor unit and the like through the system bus. Therefore, in an example embodiment, when an error occurs in IP units in an idle state, the malfunction of the system-on-chip may be prevented by preemptively processing the error before the IP units are activated.

During the monitoring operation, the error detection unit may determine whether error information stored in a register of at least one of the IP units indicates an error occurrence (S41). When error information indicating the occurrence of an error is not detected as a result of the determination in operation S41, the monitoring operation may continue. On the other hand, when error information indicating the occurrence of an error is detected in operation S41, the error detection unit may transfer information of an IP unit in which the error has occurred, to the error processing unit through an interrupt controller (S42).

As an example, in operation S42, the error detection unit may transfer information of an IP unit in which an error has occurred directly to the error processing unit without passing through a system bus. In this case, even when an error occurs in the system bus, the error processing unit may quickly process an error of the IP unit. The error detection unit may determine whether the error information is initialized in the register of the IP unit in which the error has occurred (S43).

When the error information is initialized in operation S43, the error detection unit may end the error processing operation without an additional operation. On the other hand, when the error information is not initialized in operation S43, the error detection unit may determine that an error has occurred in the interrupt controller or the system bus. In this case, the error detection unit may transfer information of the IP unit in which the error has occurred, directly to the processor unit or to the process unit through the interrupt controller (S44).

Figure 15:
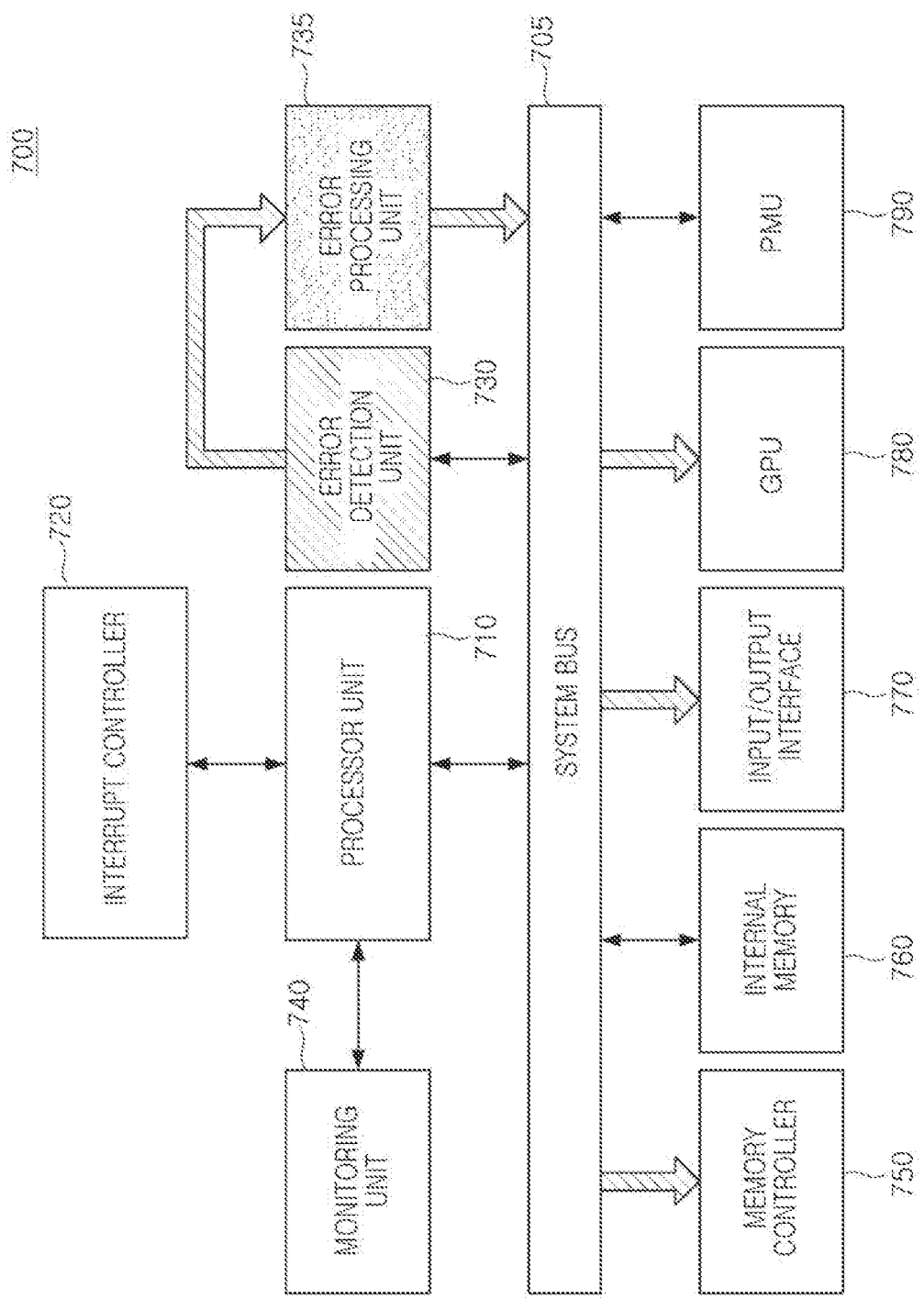
FIGS. 15 and 16 are diagrams illustrating a method of operating a system-on-chip according to an example embodiment.
Figure 16:
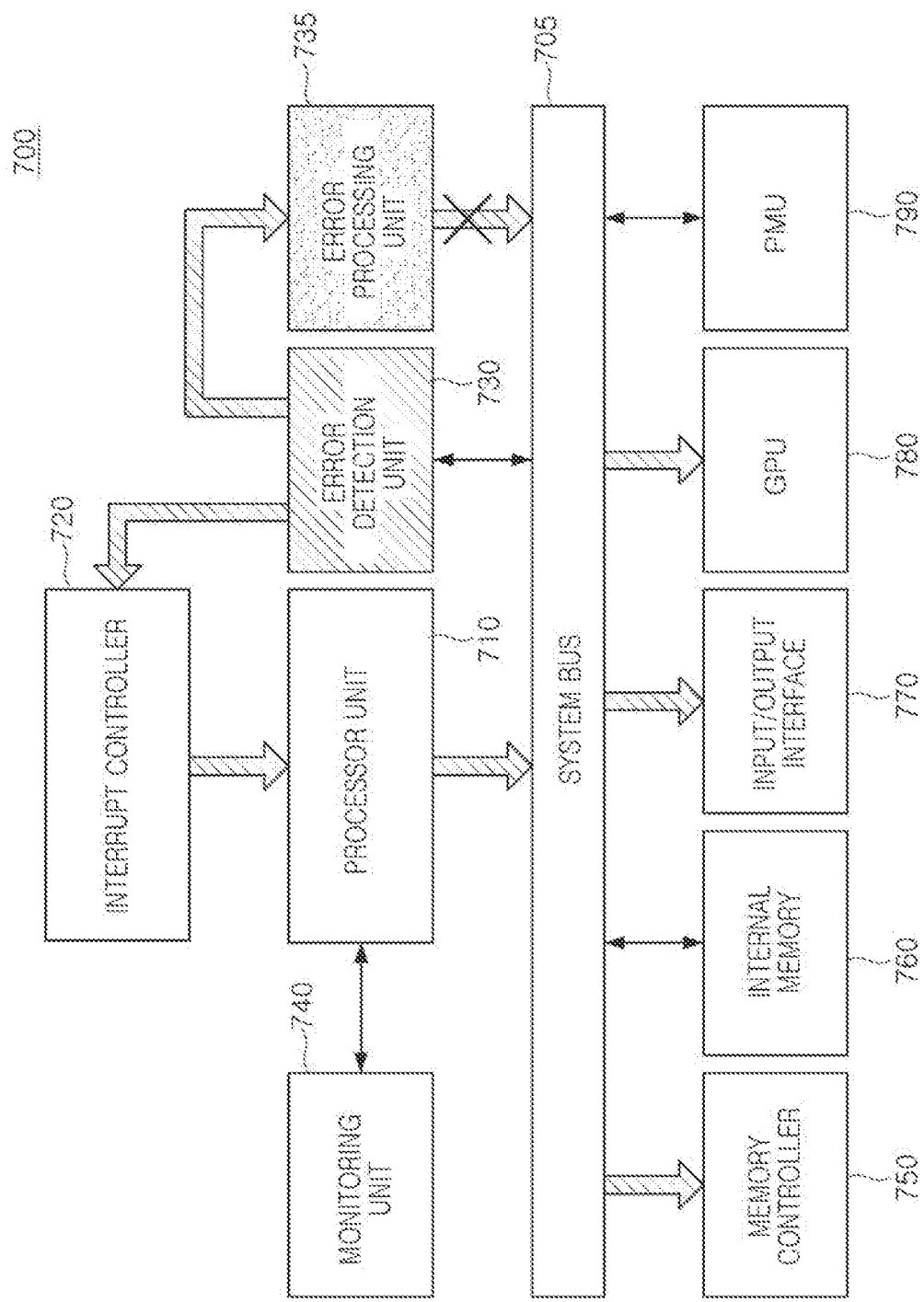
Figure 17:
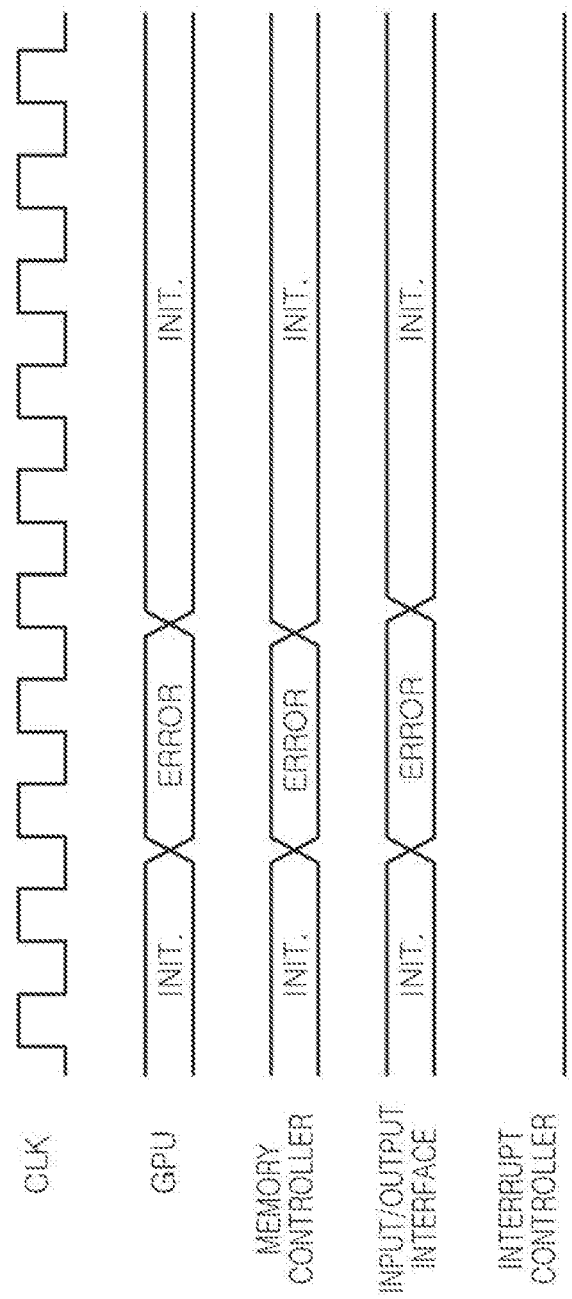
FIGS. 17 and 18 are timing diagrams illustrating a method of operating a system-on-chip according to an example embodiment.
Figure 18:
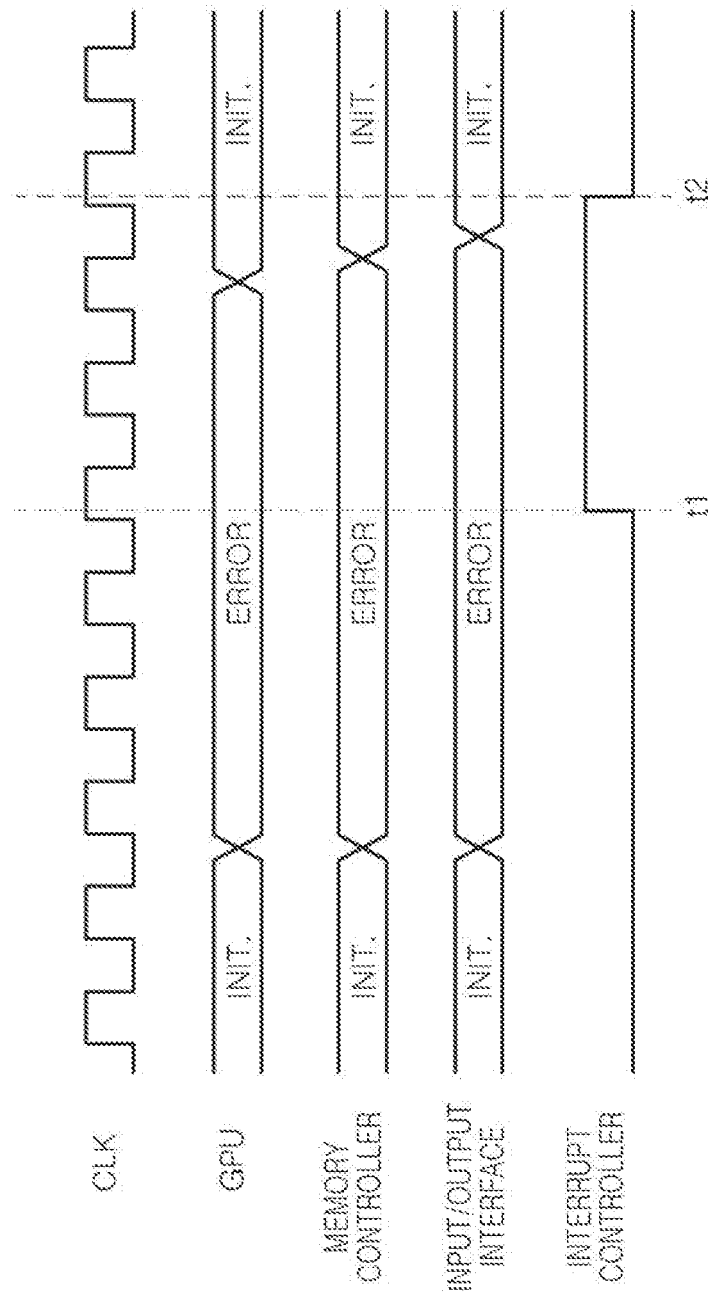

FIGS. 15 and 16 are diagrams illustrating a method of operating a system-on-chip according to an example embodiment. FIGS. 17 and 18 are timing diagrams illustrating a method of operating a system-on-chip according to an example embodiment.

A system-on-chip 700 according to an example embodiment illustrated in FIGS. 15 and 16 may include a system bus 705, a processor unit 710, an interrupt controller 720, an error detection unit 730, and an error processing unit 735, a monitoring unit 740, and a plurality of IP units 750 to 790. For example, the plurality of IP units may include memory controller 750, internal memory 760, input/output interface 770, graphics processing unit 780 and power management unit 790. The error processing unit 735 may operate based on an operating system different from that of the processor unit 710.

Referring first to FIG. 15, the error detection unit 730 may monitor a register in which error information is stored in each of the IP units 750 to 790. When error information is detected in an error state in a register of at least one of the IP units 750 to 790, the error detection unit 730 may notify the error processing unit 735 that the error has occurred. In an example, the error detection unit 730 may notify the error processing unit 735 of the information of the IP unit in which the error has occurred. The error processing unit 735 may process errors of the IP units in which the error has occurred, for example, the memory controller 750, the input/output interface 770, the graphics processing unit 780, and may initialize the error information.

FIG. 17 is a timing diagram for describing an operation of the system-on-chip 700 illustrated in FIG. 15. Referring to the timing diagram of FIG. 17, the state of a register in which error information is stored in each of the memory controller 750, the input/output interface 770 and the graphics processing unit 780 is illustrated together with an internal clock signal CLK of the system-on-chip 700.

For example, when an error occurs in the memory controller 750, the input/output interface 770, and the graphics processing unit 780, error information stored in a register of each of the memory controller 750, the input/output interface 770, and the graphics processing unit 780 may be changed from an initial state (INIT.) to an error state (ERROR). When the error detection unit 730 detects that the error information is changed to the error state ERROR, the error detection unit 730 may notify the error processing unit 735 that an error has occurred in the memory controller 750, the input/output interface 770 and the graphics processing unit 780.

The error processing unit 735 that is notified the error has occurred may process an error of the memory controller 750, the input/output interface 770, and the graphics processing unit 780. When the error is processed, the error information stored in the registers of the memory controller 750, the input/output interface 770, and the graphics processing unit 780 may be initialized to an initial state (INIT.).

Next, in an example embodiment illustrated in FIG. 16, when error information is detected in an error state in a register of at least one of the IP units 750 to 790, the error detection unit 730 may notify the error processing unit 735 of information of the IP unit in which an error has occurred. However, the example embodiment illustrated in FIG. 16 may correspond to a case in which an error occurs in the error processing unit 735 and the error processing unit 735 fails to process the error despite the request of the error detection unit 730.

The error detection unit 730 notifies the error processing unit 735 that the error has occurred, and then may continuously monitor registers of the memory controller 750, the input/output interface 770, and the graphics processing unit 780, in which the error has occurred. The error processing unit 735 is notified that an error has occurred, and after a predetermined time has elapsed, when the error information of the register is not initialized to the initial state (INIT.), the error detection unit 730 may request the interrupt controller 720 to generate an interrupt. In an example embodiment illustrated in FIG. 18, the error detection unit 730 may transmit the generated interrupt to the interrupt controller 720 at a first time point t1.

The interrupt controller 720 may output an interrupt for notifying the processor unit 710 that an error has occurred in the memory controller 750, the input/output interface 770, and the graphics processing unit 780, in response to a request from the error detection unit 730. The processor unit 710 may process an error of the memory controller 750, the input/output interface 770, and the graphics processing unit 780 in response to the interrupt, and may return the error information of the register to the initial state (INIT.).

Figure 19:
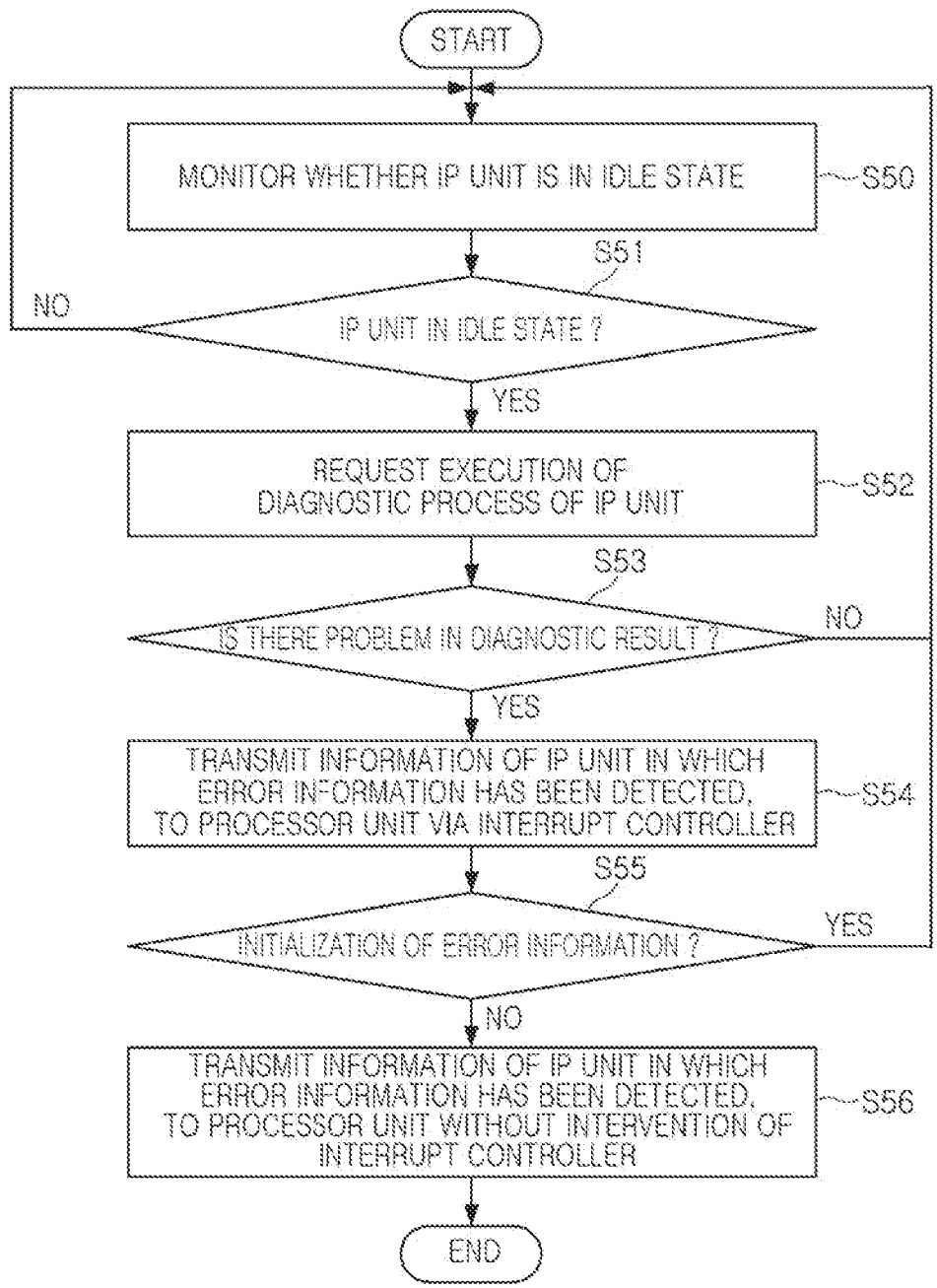
FIG. 19 is a flowchart illustrating a method of operating a system-on-chip according to an example embodiment.

FIG. 19 is a flowchart illustrating a method of operating a system-on-chip according to an example embodiment.

Referring to FIG. 19, a method of operating a system-on-chip according to an example embodiment may include an error detection unit monitoring whether an IP unit is in an idle state (S50). In an example, the idle state of the IP unit may be defined as a state in which the IP unit does not operate by actually inputting/outputting or processing data. The error detection unit may determine whether the IP unit is in an idle state through the monitoring operation (S51).

When it is determined that the IP unit is in the idle state as a result of the determination in operation S51, the error detection unit may request execution of a diagnostic process from the IP unit in the idle state (S52). Upon receiving the request from the error detection unit, the IP unit may execute a diagnostic process to determine whether a problem exists (S53).

When there is a problem as a result of the determination in operation S53, in detail, it is determined that an error has occurred, the IP unit may update the error information of the register to indicate the occurrence of the error. In addition, information about the IP unit in which the error information has been detected may be transmitted through the interrupt controller (S54). Operation S54 may be executed by the IP unit or may be executed by the error detection unit.

The error detection unit may monitor the register in which the error information of the IP unit is stored and may determine whether the error information is initialized (S55). In an example, when the IP unit or error detection unit succeeds in delivering error information to the processor unit via the interrupt controller, the error information may be initialized. Therefore, when the error information is not initialized, the error detection unit may determine that a problem occurred in the interrupt controller, the system bus or the like, so that the error of the IP unit is not normally processed.

When the error information is not initialized in operation S55, the error detection unit may directly transmit information of the IP unit in which the error information has been detected, to the processor unit without intervention of the interrupt controller (S56). Alternatively, the error detection unit may transfer information of the IP unit in which the error information has been detected to a separate error processing unit, or may reset the IP unit in which the error information has been detected by controlling the power management unit. In detail, the error detection unit notifies the processor unit of information of the IP unit in which the error information has been detected through the interrupt controller and even after a predetermined time has elapsed, when the error information of the IP unit is not initialized, the error detection unit may perform processes for handling errors of the IP unit via various routes.

The system-on-chip according to various embodiments described above may be applied to an autonomous vehicle.

When the error detection unit of the system-on-chip applied to the autonomous vehicle detects an error from at least one of the IP units, the error processing unit or the processor unit may handle the error. However, when the error is not handled for a predetermined period of time, the system-on-chip may forcibly stop the autonomous vehicle and enter a safety mode to diagnose the system.

The method of handling an error occurring in the IP units may include restarting the IP unit in which the error has occurred, forcibly turning off the IP unit in which the error has occurred by controlling the power management unit, or the like. On the other hand, in a case in which the above operations are executed during the operation of the autonomous vehicle, a safety accident may occur, and thus, the system-on-chip may first stop the vehicle and then perform the above operations.

As set forth above, according to an example embodiment, an error detection unit operating as a master device for a plurality of IP units is included in a system-on-chip, and the error detection unit may monitor a register in which error information is stored in each of the plurality of IP units. When error information is detected, the error detection unit may deliver the error information to a processor unit and/or a separate error processing unit directly or via an interrupter. By implementing an error detection unit that operates as a master device for a plurality of IP units in hardware to be implemented inside the system-on-chip, an error may be processed quickly and stably without increasing resources of the system-on-chip.

At least one of the components, elements, modules or units represented by a block as illustrated in FIGS. 1A, 1B, 2-5, 9, 10, 13, 15 and 16 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While example embodiments have been illustrated and described above, it will be apparent to those skilled in the art that modifications and variations could be made without departing from the scope of the present disclosure as defined by the appended claims.

What is claimed is:

1. A system-on-chip (SOC) comprising:
  a system bus;
  a plurality of modules connected to the system bus;
  a processor configured to control the plurality of modules via the system bus;
  an interrupt controller configured to transmit an interrupt signal to the processor;
  error detection circuitry connected between the system bus and the interrupt controller, wherein the error detection circuitry is configured to monitor at least one register imbedded in at least one of the plurality of modules; and
  a power management unit configured to provide power for a various component in the SOC;
  wherein the at least one register is configured to be reset if the error detection circuitry transmits a signal to the interrupt controller; and
  wherein the error detection circuitry is configured to control power supply to the interrupt controller, the system bus, or the plurality of modules by controlling the power management unit.

2. The SOC of claim 1, further comprising error processing circuitry configured to operate in an operating system different from an operating system of the processor.

3. The SOC of claim 2, wherein the at least one register is configured to store error information, wherein the error information indicates whether an error has occurred at the at least one of the plurality of modules.

4. The SOC of claim 3, wherein the error detection circuitry is further configured to directly transmit the error information of the at least one of the plurality of modules, to the processor.

5. The SOC of claim 1, wherein the at least one register is configured to be reset if the error detection circuitry transmits a signal to the processor.

6. The SOC of claim 5, wherein the processor is configured to reset the at least one register.

7. The SOC of claim 6, wherein the error detection circuitry is configured to notify directly to the processor if the at least one register is not reset for a predetermined period of time.

8. The SOC of claim 1, wherein the error detection circuitry is further configured to request that the interrupt controller generate an interrupt corresponding to at least one module among the plurality of modules corresponding to error information based on the error information being detected from the at least one register.

9. The SOC of claim 8, wherein the processor is further configured to, based on the interrupt corresponding to the error information being received, process an error of the at least one module in which the error information is detected and reset the error information in the at least one register.

10. The SOC of claim 1, the error detection circuitry is configured to operate as a master device for the plurality of modules.

11. The SOC of claim 1, wherein the error detection circuitry is configured to operate on a basis of code expressed in hardware form available at a register-transfer level (RTL) level and a gate level.

12. A system-on-chip (SOC) comprising:
  a system bus;

a plurality of modules connected to the system bus;

a processor configured to control the plurality of modules via the system bus;

an interrupt controller configured to transmit an interrupt signal to the processor; and error detection circuitry connected between the system bus and the interrupt controller, wherein the error detection circuitry is configured to monitor at least one register imbedded in at least one of the plurality of modules, wherein the at least one register is configured to be reset if the error detection circuitry transmits a signal to the interrupt controller, wherein the processor is configured to reset the at least one register, and wherein the error detection circuitry is configured to notify directly to the processor if the at least one register is not reset for a predetermined period of time.

13. The SOC of claim 12, further comprising a power management unit configured to provide power for a various component in the SOC.

14. The SOC of claim 12, further comprising error processing circuitry configured to operate in an operating system different from an operating system of the processor.

15. The SOC of claim 14, wherein the at least one register is configured to store an error information, and wherein the error information indicates whether an error has occurred at the at least one of the plurality of modules.

16. The SOC of claim 15, wherein the error detection circuitry is further configured to directly transmit the error information of the at least one of the plurality of modules, to the processor.

17. The SOC of claim 12, wherein the error detection circuitry is further configured to request that the interrupt controller generate an interrupt corresponding to at least one module among the plurality of modules corresponding to error information based on the error information being detected from the at least one register.

18. The SOC of claim 17, wherein the processor is further configured to, based on the interrupt corresponding to the error information being received, process an error of the at least one module in which the error information is detected and reset the error information in the at least one register.

19. The SOC of claim 12, the error detection circuitry is configured to operate as a master device for the plurality of modules.

20. A system-on-chip comprising:

a system bus;

a plurality of modules connected to the system bus;

a processor configured to control the plurality of modules via the system bus;

an interrupt controller configured to transmit an interrupt signal to the processor; and error detection circuitry connected between the system bus and the interrupt controller, wherein the error detection circuitry is configured to monitor at least one register imbedded in at least one of the plurality of modules, wherein the error detection circuitry is configured to operate as a master device for the plurality of modules.

* * * * *